(12) United States Patent
Kurihara et al.

(10) Patent No.: US 10,483,522 B2
(45) Date of Patent: Nov. 19, 2019

(54) LITHIUM-ION SECONDARY BATTERY

(71) Applicant: Semiconductor Energy Laboratory Co., Ltd., Atsugi-shi, Kanagawa-ken (JP)

(72) Inventors: Naoki Kurihara, Shinagawa (JP); Junpei Momo, Sagamihara (JP); Ryota Tajima, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 177 days.

(21) Appl. No.: 15/127,290

(22) PCT Filed: Mar. 12, 2015

(86) PCT No.: PCT/IB2015/051793
§ 371 (c)(1),
(2) Date: Sep. 19, 2016

(87) PCT Pub. No.: WO2015/145288
PCT Pub. Date: Oct. 1, 2015

(65) Prior Publication Data
US 2017/0133660 A1 May 11, 2017

(30) Foreign Application Priority Data
Mar. 24, 2014 (JP) ................. 2014-059420

(51) Int. Cl.
*H01M 4/04* (2006.01)
*H01M 4/58* (2010.01)
(Continued)

(52) U.S. Cl.
CPC .......... *H01M 4/0445* (2013.01); *H01M 2/14* (2013.01); *H01M 4/13* (2013.01); *H01M 4/582* (2013.01);
(Continued)

(58) Field of Classification Search
None
See application file for complete search history.

(56) References Cited

U.S. PATENT DOCUMENTS 6,365,299 B1  4/2002  Miyaki et al.
6,506,524 B1  1/2003  McMillan et al.
(Continued)

FOREIGN PATENT DOCUMENTS

CN   001189247 A   7/1998
CN   101411009 A   4/2009
(Continued)

OTHER PUBLICATIONS

International Search Report (Application No. PCT/IB2015/051793) dated Jun. 16, 2015.
(Continued)

*Primary Examiner* — Christopher P Domone
(74) *Attorney, Agent, or Firm* — Robinson Intellectual Property Law Office; Eric J. Robinson

(57) ABSTRACT

A lithium-ion secondary battery with no negative electrode active material is provided. One embodiment of the present invention is a lithium-ion secondary battery including a positive electrode, a negative electrode, an electrolyte solution, and a separator between the positive electrode and the negative electrode. The negative electrode includes a negative electrode current collector which includes a region in direct contact with at least one of the electrolyte solution and the separator. The electrolyte solution contains fluorine. The negative electrode current collector has a function of making a deposit containing lithium to be deposited on a surface in charging. Furthermore, a spacer may be provided between the separator and the negative electrode. The electrolyte solution may contain an organic compound containing fluorine. Supply of fluorine from the electrolyte solution to lithium deposited on the surface of the negative electrode (Continued)

can suppress deposition of lithium dendrites (whiskers) in further deposition.

14 Claims, 12 Drawing Sheets

(51) Int. Cl.
*H01M 10/0568* (2010.01)
*H01M 10/0525* (2010.01)
*H01M 10/0569* (2010.01)
*H01M 2/14* (2006.01)
*H01M 4/13* (2010.01)
*H01M 4/66* (2006.01)
*H01M 10/052* (2010.01)
*H01M 10/0567* (2010.01)

(52) U.S. Cl.
CPC ......... *H01M 4/661* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2220/30* (2013.01)

(56) References Cited

U.S. PATENT DOCUMENTS

| | | | |
|---|---|---|---|
| 7,105,251 B2 | 9/2006 | Miyaki et al. | |
| 7,955,581 B2 | 6/2011 | Kogetsu et al. | |
| 8,263,241 B2 | 9/2012 | Ohtsuka et al. | |
| 8,557,437 B2 | 10/2013 | Hinoki et al. | |
| 8,722,253 B2 | 5/2014 | Hinoki et al. | |
| 8,927,148 B2 | 1/2015 | Kawakami | |
| 2008/0081263 A1 | 4/2008 | Saisho et al. | |
| 2011/0300441 A1 | 12/2011 | Kawakami | |
| 2012/0171536 A1 | 7/2012 | Kaneda | |
| 2013/0059192 A1* | 3/2013 | Kajita | H01M 2/1653 429/143 |
| 2013/0113431 A1* | 5/2013 | Banerjee | H01M 2/40 320/134 |
| 2013/0162197 A1 | 6/2013 | Takahashi et al. | |
| 2014/0030590 A1* | 1/2014 | Wang | H01B 1/04 429/211 |
| 2015/0017541 A1 | 1/2015 | Tajima et al. | |
| 2015/0093645 A1 | 4/2015 | Kawakami | |
| 2016/0261000 A1* | 9/2016 | Zhang | H01M 4/40 |
| 2017/0244093 A1* | 8/2017 | Fan | H01M 4/0445 |

FOREIGN PATENT DOCUMENTS

| | | |
|---|---|---|
| CN | 101847709 A | 9/2010 |
| CN | 102082295 A | 6/2011 |
| CN | 103178308 A | 6/2013 |
| EP | 0836238 A | 4/1998 |
| JP | 04-328277 A | 11/1992 |
| JP | 05-036401 A | 2/1993 |
| JP | 07-220759 A | 8/1995 |
| JP | 08-329984 A | 12/1996 |
| JP | 2001-068162 A | 3/2001 |
| JP | 2002-298921 A | 10/2002 |
| JP | 2007-106634 A | 4/2007 |
| JP | 2008-108689 A | 5/2008 |
| JP | 2010-171019 A | 8/2010 |
| JP | 2012-018914 A | 1/2012 |
| JP | 2014-035956 A | 2/2014 |
| WO | WO-2011/135613 | 11/2011 |
| WO | WO-2011/152183 | 12/2011 |
| WO | WO-2014/024990 | 2/2014 |

OTHER PUBLICATIONS

Written Opinion (Application No. PCT/IB2015//051793) dated Jun. 16, 2015.
Ogumi.Z et al., "Carbon material", Lithium secondary battery, Mar. 20, 2008, p. 104, OHMSHA.
Chinese Office Action (Application No. 201580016096.3) dated Oct. 8, 2018.

* cited by examiner

LITHIUM-ION SECONDARY BATTERY

TECHNICAL FIELD

One embodiment of the present invention relates to a lithium-ion secondary battery and a fabrication method thereof.

Note that one embodiment of the present invention is not limited to the above technical field. The technical field of one embodiment of the invention disclosed in this specification and the like relates to an object, a method, or a fabrication method. In addition, one embodiment of the present invention relates to a process, a machine, manufacture, or a composition (a composition of matter). Specifically, examples of the technical field of one embodiment of the present invention disclosed in this specification include a semiconductor device, a display device, a light-emitting device, a power storage device, a memory device, a method for driving any of them, and a method for fabricating any of them.

BACKGROUND ART

Examples of the secondary battery include a nickel-metal hydride battery, a lead secondary battery, and a lithium-ion secondary battery.

Such secondary batteries are used as power sources of portable information terminals typified by mobile phones. In particular, lithium-ion secondary batteries have been actively researched and developed because capacity thereof can be increased and size thereof can be reduced.

A lithium-ion secondary battery includes various members such as an electrode current collector, an electrode active material, an electrolyte solution, a separator, and an exterior body lead electrode, and is fabricated through a large number of steps. In view of use in a wide range of applications, low-cost fabrication is important; as materials to be used, the number of steps required for the fabricating, and time required for the fabricating are reduced, the fabricating cost can be suppressed.

Note that a negative electrode of a lithium-ion secondary battery is generally formed by application of an active material formed of a carbon material onto a negative electrode current collector. An active material refers to a material that relates to insertion and extraction of ions (lithium ions) that are carriers. An active material layer formed by application of an active material onto a current collector includes a conductive additive, a binder, and the like in addition to the active material in some cases.

For a material suitable for a negative electrode, lithium metal has favorable characteristics because of its low redox potential and high specific capacity per unit volume and per unit weight. However, in the secondary battery, lithium in an electrolyte solution is deposited in the form of dendrites (in the form of whiskers) on lithium metal at the time of charging and penetrates a separator, which causes a short circuit in some cases. Furthermore, basal portions of the dendrites (whiskers) are dissolved in the electrolyte solution at the time of discharging and isolated lithium is generated, leading to a problem of low cycle characteristics. Thus, in a lithium-ion secondary battery that has been in practical use, an active material formed of a carbon material is applied onto a current collector to form an active material layer, and occlusion and release of lithium ions are utilized as a reaction of a negative electrode (Non-Patent Document 1).

However, when an active material layer is formed, as apparatuses, many facilities such as a mixer for forming slurry, a coater for coating slurry, and a dryer for drying the slurry are needed. Furthermore, time for each step in which such an apparatus is used is required. Furthermore, members such as an active material, a conductive additive, and a binder are expensive. In the case of an electrode in which an active material layer is used, the potential of a cell is decreased by the reaction potential of an active material in the secondary battery, resulting in a decrease in energy density. Meanwhile, if a method in which lithium is directly deposited on a current collector is employed, a negative electrode has the lowest potential in all components in a secondary battery; thus, a secondary battery having a highest energy density can be fabricated.

REFERENCE

Patent Document

[Patent Document 1] Japanese Published Patent Application No. H4-328277
[Patent Document 2] Japanese Published Patent Application No. 2007-106634

Non-Patent Document

[Non-Patent Document 1] Edited and written by Zempachi Ogumi, "Lithium Secondary Batteries", the 1st edition, Ohmsha, Ltd., Mar. 20, 2008, p 104

SUMMARY OF THE INVENTION

Problem to be Solved by the Invention

An object of one embodiment of the present invention is to fabricate a negative electrode without using an active material formed of a carbon-based material. Another object is to provide a lithium-ion secondary battery without increasing temporal and financial costs accompanied by formation of a negative electrode active material layer. Another object is to reduce the amount of lithium in the form of dendrites (in the form of whiskers) that is deposited on a surface of lithium metal in the negative electrode at the time of charging. Alternatively, another object is to provide a lithium-ion secondary battery with favorable cycle characteristics. Furthermore, another object is to provide a secondary battery with high capacity per unit mass and volume. Alternatively, another object of one embodiment of the present invention is to provide a novel secondary battery, a novel power storage device, a novel method of fabricating a secondary battery, or a novel method of fabricating a power storage device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

Means for Solving the Problems

One embodiment of the present invention is a lithium-ion secondary battery including a positive electrode, a negative electrode, an electrolyte solution, and a separator between the positive electrode and the negative electrode. The negative electrode includes a negative electrode current collector. The negative electrode current collector includes a region in direct contact with at least one of the electrolyte solution and the separator. The electrolyte solution contains fluorine. The negative electrode current collector has a function of making a deposit containing lithium to be deposited on a surface at the time of charging.

Furthermore, another embodiment of the present invention is a lithium-ion secondary battery including a positive electrode, a negative electrode, an electrolyte solution, a separator between the positive electrode and the negative electrode, and a spacer between the separator and the negative electrode. The negative electrode includes a negative electrode current collector. The negative electrode current collector is in direct contact with the spacer. The electrolyte solution contains fluorine. A deposit containing lithium is deposited in a region between the separator and the negative electrode current collector.

Furthermore, another embodiment of the present invention is a lithium-ion secondary battery including a positive electrode, a negative electrode, an electrolyte solution, a separator between the positive electrode and the negative electrode, and a sheet-like spacer between the separator and the negative electrode. The sheet-like spacer has higher porosity than the separator. The negative electrode includes a negative electrode current collector. The negative electrode current collector is in direct contact with the spacer. The electrolyte solution contains fluorine. A deposit containing lithium is deposited in a region between the separator and the negative electrode current collector.

Furthermore, another embodiment of the present invention is a lithium-ion secondary battery including a positive electrode, a negative electrode, an electrolyte solution, a separator between the positive electrode and the negative electrode, and a spacer between the separator and the negative electrode. The negative electrode includes a negative electrode current collector. The negative electrode current collector is in direct contact with the spacer. The electrolyte solution contains fluorine. The positive electrode, the negative electrode, the separator, and the spacer have flexibility. A deposit containing lithium is deposited in a region between the separator and the negative electrode current collector.

Note that in one embodiment of the present invention, the lithium ion secondary battery may be one in which fluorine is contained in an organic compound or an inorganic salt of the electrolyte solution, and in the electrolyte solution, the organic compound or the inorganic salt is 2 wt % or more to the weight of the electrolyte solution. Furthermore, the lithium-ion secondary battery may be one in which the organic compound is fluoroethylene carbonate. Furthermore, the lithium-ion secondary battery may be one in which the inorganic salt is lithium tetrafluoroborate or lithium hexafluorophosphate. Furthermore, the lithium-ion secondary battery may be one in which the negative electrode does not include an active material layer. Furthermore, the lithium-ion secondary battery may be one in which the negative electrode current collector contains copper. Furthermore, the lithium-ion secondary battery may be one in which the deposit containing lithium is lithium fluoride.

In the case where lithium is directly deposited on a negative electrode current collector formed of, for example, cupper without using an active material layer formed of a carbon material, ideally, lithium is formed in a film form over the current collector and the film is grown by charging. However, when lithium is deposited on the negative electrode current collector, lithium in the form of dendrites (in the form of whiskers) is generated, thereby causing a problem. Thus, as the results of examining the conditions causing no whiskers at the time of charging, it is found that the presence of fluorine on the surface of the current collector prevents formation of whiskers.

Thus, it is confirmed that as a salt containing lithium in the electrolyte solution included in the secondary battery, the use of a salt further containing fluorine, e.g., lithium tetrafluoroborate or lithium hexafluorophosphate can prevent formation of lithium in the form of dendrites (in the form of whiskers) on the surface of the negative electrode current collector. Furthermore, cycle characteristics of the secondary battery is improved, and the capacity of the battery per unit mass and volume can be increased.

Furthermore, it is confirmed that addition of an organic compound containing fluorine, e.g., fluoroethylene carbonate to an electrolyte solution as an additive enables the cycle characteristics to be further improved and the capacity of the battery per unit mass and volume to be further increased. Even when the salt containing fluorine is not used as an electrolyte, fluorine is supplied to the surface of the negative electrode by the presence of the organic compound containing fluorine in the electrolyte solution as the additive; thus, the cycle characteristics is improved.

Furthermore, when a spacer is provided between the separator and the negative electrode current collector, a region where lithium can be deposited can be secured in a region between the separator and the negative electrode current collector. Although lithium can be deposited on the surface of the negative electrode current collector without the spacer, the spacer makes it possible to increase the region where lithium can be deposited. Note that in order to secure the region to be larger, the volume occupied by the spacer is preferably small. For example, when a spacer in the form of a sheet is to be used, porosity is desirably high. The spacer with high porosity enables the weight of the lithium-ion secondary battery to be reduced.

Meanwhile, because the spacer does not need to support the structure of the lithium-ion secondary battery, it is not necessary to use a spacer with a certain shape, and a flexible spacer can be used. The flexible spacer can be used in a flexible lithium-ion secondary battery, and the spacer can change its shape in accordance with the change in the shape of the lithium-ion secondary battery.

The negative electrode without providing an active material layer can be used in the lithium-ion secondary battery; thus, the secondary battery can be fabricated without increasing facility, temporal and financial costs accompanied by steps of forming the active material layer.

Effect of Invention

According to one embodiment of the present invention, a negative electrode can be fabricated without using an active material formed of a carbon-based material. A lithium-ion secondary battery can be provided without increasing temporal and financial costs accompanied by formation of a negative electrode active material layer. The amount of lithium in the form of dendrites (in the form of whiskers) that is deposited on a surface of lithium metal in the negative electrode at the time of charging can be reduced. Furthermore, a lithium-ion secondary battery with favorable cycle characteristics can be provided. Furthermore, a secondary battery with high capacity per unit mass and volume can be provided. Furthermore, according to one embodiment of the present invention, a novel secondary battery, a novel power storage device, a novel method of fabricating a secondary battery, or a novel method of fabricating a power storage device can be provided.

Note that the description of these effects does not disturb the existence of other effects. In one embodiment of the present invention, there is no need to obtain all the effects. Other effects will be apparent from and can be derived from the description of the specification, the drawings, the claims, and the like.

BEST MODE FOR CARRYING OUT THE INVENTION

Figure 1A:
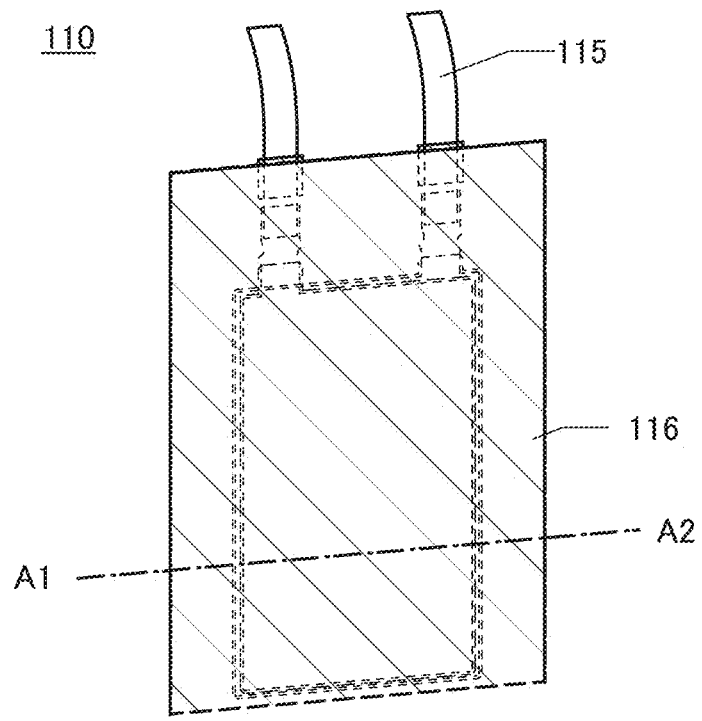
FIGS. 1A and 1B Diagrams illustrating a secondary battery of one embodiment of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments and the examples.

Note that in each drawing explained in this specification, the size of each component, such as the thickness and the size of a positive electrode, a negative electrode, an active material layer, a separator, an exterior body, and the like is exaggerated for clarity of explanation in some cases. Therefore, the sizes of the components are not limited to the sizes in the drawings and relative sizes between the components.

Ordinal numbers such as "first", "second", and "third" are used for convenience and do not denote the order of steps or the stacking order of layers. In addition, the ordinal numbers in this specification and the like do not denote particular names which specify the present invention.

Note that in the structures of one embodiment of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

The descriptions in embodiments for the present invention can be combined with each other as appropriate.

(Embodiment 1)

Figure 1B:
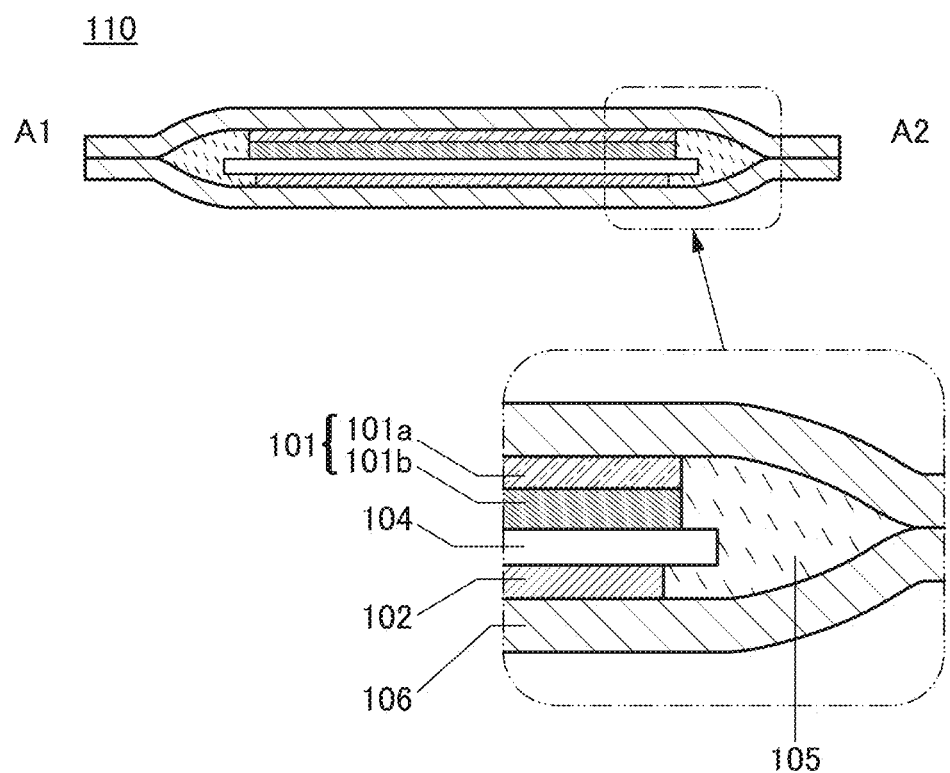

A method for fabricating a lithium-ion secondary battery 110 of one embodiment of the present invention is described below with reference to FIGS. 1A and 1B. FIG. 1B is a cross-sectional view of the lithium-ion secondary battery 110. It is a schematic cross-sectional view in which a positive electrode current collector 101a, a positive electrode active material layer 101b, a separator 104, and a negative electrode current collector 102 are stacked and together with an electrolyte solution 105, enclosed by an exterior body 106. Note that the secondary battery can have a stacked structure. Although a positive electrode 101 includes the positive electrode current collector 101a and the positive electrode active material layer 101b, a negative electrode does not include a negative electrode active material layer. Thus, the negative electrode current collector 102 is a main component of the negative electrode. The negative electrode current collector 102 is in direct contact with the separator 104 in some cases; in that case, the negative electrode current collector 102 is in direct contact with the electrolyte solution 105 existing in pores included in the separator 104. Meanwhile, in the case where the separator 104 is not in contact with the negative electrode current collector 102, the electrolyte solution 105 is in contact with the negative electrode current collector 102 in the entire region of at least one surface of the negative electrode current collector 102.

The negative electrode is described. The negative electrode does not include an active material layer, and the negative electrode current collector 102 is a main component of the negative electrode.

The negative electrode current collector 102 can be formed using a material, which has high conductivity and is not alloyed with carrier ions such as lithium, e.g., a metal typified by stainless steel, gold, platinum, zinc, iron, copper, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like.

Lithium metal has preferable characteristics because of its low redox potential and high specific capacity per unit weight and per unit volume; however, handling in consideration of safety is needed due to reactivity of lithium metal in the atmosphere, which is a problem. Thus, it is preferable that lithium metal be not used in the negative electrode current collector. Even when lithium metal is deposited on the current collector by charging of the secondary battery, the above problem does not occur because the secondary battery is tightly sealed.

The negative electrode current collector 102 is not covered with an active material layer and includes at least a region in contact with the electrolyte solution 105 or the separator. Accordingly, lithium is deposited on the region of the negative electrode 102 by the reaction of charging. However, when the charging proceeds, lithium in the electrolyte solution is deposited in the form of dendrites (in the form of whiskers) on the lithium. When the charging proceeds further, lithium in the form of dendrites (in the form of whiskers) grows and penetrates the separator, causing a short circuit in some cases. Furthermore, the basal portions of the dendrite (whiskers) are dissolved into the electrolyte solution at the time of discharging and thus isolated lithium is generated, which causes a problem in that the capacity is reduced due to lithium that is lost in the electrolyte solution without involving a battery reaction and cycle characteristics is reduced.

The above problem can be avoided by provision of an active material layer formed of a carbon material over the negative electrode current collector, for example. However, when the active material layer is formed, as apparatuses, many facilities, e.g., a mixer for forming slurry, a coater for coating slurry, and a dryer for drying the slurry are needed. Furthermore, time for each step in which such an apparatus is used is required. Furthermore, members such as an active material, a conductive additive, and a binder are expensive. In the secondary battery of one embodiment of the present invention, an active material layer is not provided on the negative electrode current collector; thus, part of fabricating facilities can be omitted, and fabricating cost can be reduced.

Moreover, in the case of an electrode in which an active material layer is used, the potential of a cell is decreased by the reaction potential of an active material in the secondary battery, whereby energy density is decreased. In contrast, in a secondary battery of one embodiment of the present invention, because lithium is directly deposited on a current collector, a negative electrode has the lowest potential in all of the components in the secondary battery and thus the secondary battery having the highest energy density can be fabricated.

Through the above steps, the negative electrode of the lithium-ion secondary battery can be formed.

First, the positive electrode 101 is described.

The positive electrode 101 includes at least the positive electrode current collector 101a and the positive electrode active material layer 101b.

For the positive electrode active material, a material into and from which carrier ions such as lithium ions can be inserted and extracted can be used. For example, a lithium-containing material with an olivine-type crystal structure, a layered rock salt-type crystal structure, and a spinel-type crystal structure can be used.

Typical examples of the lithium-containing material with an olivine-type structure (general formula: $LiMPO_4$ (M is Fe(II), Mn(II), Co(II), or Ni(II))), are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

Lithium iron phosphate ($LiFePO_4$) is particularly preferable because it properly satisfies conditions necessary for the positive electrode active material, such as safety, stability, high capacity density, high-generated potential, and the existence of lithium which can be extracted in initial oxidation (charging).

Examples of the lithium-containing material with a layered rock salt-type structure include lithium cobalt oxide ($LiCoO_2$), $LiNiO_2$, $LiMnO_2$, $Li_2MnO_3$, an NiCo-based lithium-containing material (general formula: $LiNi_xCo_{1-x}O_2$ (0<x<1)) such as $LiNi_{0.8}Co_{0.2}O_2$, an NiMn-based lithium-containing material (general formula: $LiNi_xMn_{1-x}O_2$ (0<x<1)) such as $LiNi_{0.5}Mn_{0.5}O_2$, and an NiMnCo-based lithium-containing material (also referred to as NMC, and general formula is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$-$LiMO_2$ (M is Co, Ni, or Mn), and the like can be given.

In particular, $LiCoO_2$ is preferable because it has high capacity, stability in the air higher than that of $LiNiO_2$, and thermal stability higher than that of $LiNiO_2$, for example.

Examples of the lithium-containing material with a spinel-type crystal structure are $LiMn_2O_4$, $Li_{1+x}Mn_{2-x}O_4$, $Li(MnAl)_2O_4$, $LiMn_{1.5}Ni_{0.5}O_4$, and the like.

It is preferable to add a small amount of lithium nickel oxide ($LiNiO_2$ or $LiNi_{1-x}MO_2$ (M=Co, Al, or the like)) to the lithium-containing material with a spinel-type crystal structure which contains manganese such as $LiMn_2O_4$, because advantages such as suppression of dissolution of manganese and suppression of decomposition of an electrolyte solution can be obtained.

Furthermore, a composite oxide expressed by $Li_{(2-j)}MSiO_4$, general formula, (M is Fe(II), Mn(II), Co(II), or Ni(II), 0≤j≤2) can also be used as the positive electrode active material. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Alternatively, a nasicon-type compound represented by a general formula $A_xM_2(XO_4)_3$ (A is Li, Na, or Mg) (M is Fe, Mn, Ti, V, Nb, or Al) (X is S, P, Mo, W, As, or Si), can be used as the positive electrode active material. Examples of the nasicon-type compound are $Fe_2(MnO_4)_3$, $Fe_2(SO_4)_3$, $Li_3Fe_2(PO_4)_3$, and the like. Further alternatively, a compound represented by a general formula $Li_2MPO_4F$, $Li_2MP_2O_7$, or $Li_5MO_4$ (M is Fe or Mn), a perovskite fluoride such as $NaFeF_3$, a metal chalcogenide (a sulfide, a selenide, or a telluride) such as $TiS_2$ or $MoS_2$, a lithium-containing material with an inverse spinel type crystal structure such as $LiMVO_4$, a vanadium oxide ($V_2O_5$, $V_6O_{13}$, $LiV_3O_8$, or the like), a manganese-oxide-based material, an organic-sulfur-based material, or the like can be used as the positive electrode active material.

In the case where carrier ions are alkali metal ions other than lithium ions, alkaline-earth metal ions, beryllium ions, or magnesium ions, the positive electrode active material may contain, instead of lithium in the compound and the oxide, an alkali metal (e.g., sodium or potassium), an alkaline-earth metal (e.g., calcium, strontium, or barium), beryllium, or magnesium. For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

The average particle diameter of the primary particle of the positive electrode active material is preferably greater than or equal to 50 nm and less than or equal to 100 µm.

Examples of a conductive additive of an electrode include acetylene black (AB), graphite (black lead) particles, carbon nanotubes, graphene, and fullerene.

A network for electron conduction can be formed in the electrode by the conductive additive. The conductive additive allows maintaining of a path for electric conduction between the positive electrode active materials. By addition of the conductive additive to the positive electrode active material layer, the positive electrode active material layer 101b with high electron conductivity can be achieved.

Furthermore, as a binder, in addition to polyvinylidene fluoride (PVDF) that is a typical example, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose, and the like can be used.

The content of the binder in the positive electrode active material layer 101b is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 101b is preferably greater than or equal to 1 wt % and less than or equal to 10 wt %, more preferably greater than or equal to 1 wt % and less than or equal to 5 wt %.

In the case where the positive electrode active material layer 101b is formed by a coating method, the positive electrode active material, the binder, the conductive additive, and the dispersion medium are mixed to form an electrode slurry, and it may be applied to the positive electrode current collector 101a and dried. In this embodiment, a metal material including aluminum as its main component is preferably used as the positive electrode current collector 101a.

Note that the positive electrode current collector 101a can be formed using a material, which has high conductivity and is not alloyed with carrier ions of lithium or the like, such as stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector can have a foil shape, a plate (sheet) shape, a net shape, a punching-metal shape, an expanded-metal shape, or the like as appropriate.

Through the above steps, the positive electrode of the lithium-ion secondary battery can be formed.

The separator 104 is described.

The separator 104 may be formed using a material such as paper, nonwoven fabric, a glass fiber, or a synthetic fiber such as nylon (polyamide), vinylon (a polyvinyl alcohol based fiber), polyester, acrylic, polyolefin, or polyurethane. However, a material which does not dissolve in an electrolyte solution described later should be selected.

More specifically, as a material for the separator 104, any of a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and fiberglass can be used either alone or in combination.

The separator 104 needs to have an insulating property of inhibiting the contact between the electrodes, a property of holding the electrolyte solution, and ionic conductivity. As a method for forming a film having a function as a separator, a method for forming a film by stretching is given. Examples of the method include a stretching aperture method in which a melted polymer material is spread, heat is released from the material, and pores are formed by stretching the resulting film in the directions of two axes parallel to the film.

Next, as a method for incorporating the separator 104 in the secondary battery, a method in which the separator is inserted between the positive electrode and the negative electrode can be used. Alternatively, a method in which the separator 104 is placed on one of the positive electrode and the negative electrode and then the other of the positive electrode and the negative electrode is placed thereon can be used. The positive electrode, the negative electrode, and the separator are stored in an exterior body, and the exterior body is filled with an electrolyte solution, whereby a secondary battery can be formed.

Furthermore, the separator 104 with a size large enough to cover each surface of either the positive electrode or the negative electrode, in a form of sheet or envelope may be fabricated to form the electrode wrapped in the separator 104. In that case, the electrode can be protected from mechanical damages in the fabrication of the secondary battery and the handling of the electrode becomes easier. The electrode wrapped in the separator and the other electrode are stored in the exterior body, and the exterior body is filled with an electrolyte solution, whereby a secondary battery can be formed.

The separator 104 may be a plurality of layers. Although the separator 104 can be formed by the above method, the range of the size of the pore in the film and the thickness of the film is limited by a material of the separator and mechanical strength of the film. A first separator and a second separator each formed by a stretching method may be used together in a secondary battery. As the materials for forming the first separator and the second separator, one or more materials can be selected from the above-listed materials or the other materials. Depending on the conditions of film formation, the conditions of film stretching, and the like, properties such as the size of pores in the film, the proportion of the volume occupied by pores (also referred to as porosity), and the film thickness can each be determined. The use of the first separator and the second separator having different properties together increases the variety of properties of the separator for a secondary battery to choose from, as compared to the use of a single separator by itself.

Furthermore, the secondary battery may be flexible. In the case where flow stress is applied to the flexible secondary battery, the stress can be relieved by sliding of the first separator and the second separator at the interface between the first separator and the second separator. Therefore, the structure including the two separators is also suitable as a structure of a separator in a flexible secondary battery.

In the lithium-ion secondary battery in which an active material layer is not included in the negative electrode, the active material layer does not exist between the separator and the negative electrode current collector. Thus, a space between the separator and the negative electrode current collector is filled with an electrolyte solution described later, and at least part of the negative electrode current collector is in direct contact with the separator in some cases. Furthermore, if a spacer for keeping the distance between the separator and the negative electrode current collector does not exist, at least part of the negative electrode current collector is in direct contact with the separator in some cases. In such cases, because the separator has the pores, the electrolyte solution existing in the pores is in direct contact with the negative electrode current collector without passing through an active material layer. Note that in the case where a distance is provided on purpose between the negative electrode current collector and the separator, the spacer can be provided between the negative electrode current collector and the separator.

A spacer is described.

In the lithium-ion secondary battery of one embodiment of the present invention, a spacer can be provided between the negative electrode current collector and the separator. When the spacer is provided between the separator and the negative electrode current collector, a region where lithium can be deposited can be secured between the separator and the negative electrode current collector. Even without the spacer, lithium can be deposited on a surface of the negative electrode current collector; with the spacer, the region where lithium can be deposited can be increased. Furthermore, even without the spacer, lithium can be deposited in a cavity of the separator; with the use of the spacer, an accident such as a short circuit between the positive and negative electrodes caused by lithium deposited in the separator can be prevented.

Figure 13:
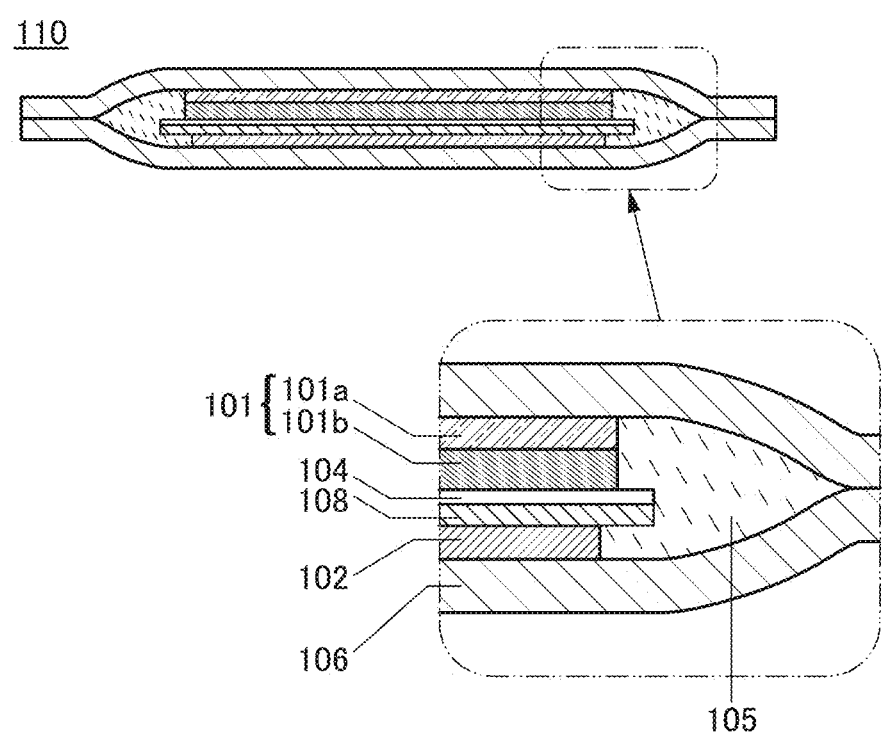
FIG. 13 A diagram illustrating a secondary battery of one embodiment of the present invention.

FIG. 13 shows a cross-sectional view of the lithium-ion secondary battery of one embodiment of the present invention in which the spacer 108 is provided between the separator 104 and the negative electrode current collector 106.

To secure a large space for the region, the volume of the spacer occupied in the space between the separator and the negative electrode current collector is preferably small. For example, when a spacer in the form of a sheet is used, porosity is desirably high, which is preferably higher than the porosity of the separator. Using the spacer with high porosity, it is not only possible to make the region where lithium is deposited large but also possible to reduce the weight of the spacer, which prevents an increase in the weight of the lithium-ion secondary battery.

Note that the spacer does not necessarily support the structure of the lithium-ion secondary battery; thus, a spacer having a high rigidity and a uniform shape is not needed, and a flexible spacer can be used. A flexible spacer can be used for a flexible lithium-ion secondary battery. Because the spacer can change its shape in accordance with the change in the shape of the lithium-ion secondary battery, the spacer does not break the negative electrode current collector and the negative electrode current collector, and breakdown of the spacer itself does not occur. However, the spacer having a high rigidity is not excluded.

Furthermore, in the case where the spacer is provided between the separator and the negative electrode current collector, it is not necessary that the separator and the negative electrode current collector be completely separated from each other, and the separator and the negative electrode current collector may be partly in contact with each other. Needless to say, the separator and the negative electrode current collector are not necessarily in direct contact with each other. It is only necessary that the region where lithium is deposited be largely secured compared to the case where the spacer is not included.

As a shape of the spacer, in addition to the above-described sheet shape, a spherical shape or a columnar shape may be employed. In the case of a spacer with a sheet shape, it can be provided by insertion between the separator and the negative electrode current collector; in the case of a spacer with a spherical shape or a columnar shape, it can be provided by dispersion on the separator or the negative electrode current collector. Furthermore, a spacer with a predetermined shape can be provided in a predetermined region by formation of a film on the separator or the negative electrode current collector and patterning of this film.

Note that as a material for the spacer, similarly to the material used for the separator, paper, nonwoven fabric, a glass fiber, a synthetic fiber such as nylon (polyamide), vinylon (a polyvinyl alcohol based fiber), polyester, acrylic, polyolefin, or polyurethane, or the like can be used. Furthermore, as a kind of nylon (polyamide), aramid can be particularly used. However, a material which does not dissolve in an electrolyte solution described later should be selected.

The electrolyte solution 105 is described.

In the lithium-ion secondary battery, the electrolyte solution is a liquid electrolyte to be a path of lithium ions serving as the movement of charge between the positive electrode and the negative electrode. Note that an aqueous electrolyte solution is electrolyzed by lithium and thus is not usable. In that reason, the one in which a salt containing lithium is dissolved in an organic solvent is used as the electrolyte solution.

The electrolyte solution 105 which can be used in the lithium-ion secondary battery is preferably a nonaqueous solution (solvent) containing an electrolyte (solute).

As a solvent for the electrolyte solution 105, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Moreover, when a gelled high-molecular material is used as the solvent of the electrolyte solution 105, safety including leakage characteristics is improved. Furthermore, the lithium-ion secondary battery can be thinner and more lightweight. Typical examples of the gelled high-molecular material include a silicone gel, an acrylic gel, an acrylonitrile gel, polyethylene oxide, polypropylene oxide, a fluorine-based polymer, and the like.

Alternatively, the use of one or more of ionic liquids (also referred to as room temperature molten salts) that have non-flammability and non-volatility as the solvent for the electrolyte solution 105 can prevent a lithium-ion secondary battery from exploding, catching fire, or the like even when the lithium-ion secondary battery internally shorts out or the internal temperature increases due to overcharging or the like. Thus, the lithium-ion secondary battery has improved safety.

Furthermore, as the electrolyte dissolved in the solvent, one or more of inorganic salts containing fluorine such as lithium salts, e.g., $LiPF_6$, $LiAsF_6$, $LiBF_4$, $LiCF_3SO_3$, $LiC_4F_9SO_3$, $LiC(CF_3SO_2)_3$, $LiC(C_2F_5SO_2)_3$, $LiN(CF_3$ $SO_2)_2$, $LiN(C_4F_9SO_2)(CF_3SO_2)$, and $LiN(C_2F_5SO_2)_2$ can be used in an appropriate combination and in an appropriate ratio.

For example, when an electrolyte solution containing lithium tetrafluoroborate ($LiBF_4$) or lithium hexafluorophosphate ($LiPF_6$) is used for a secondary battery in which a negative electrode current collector including a region without an active material is used, the state where lithium is deposited on the negative electrode current collector at the beginning of the charging and lithium and fluorine are combined with each other to form lithium fluoride is observed. Furthermore, it is observed that generation of deposited lithium dendrites (whiskers) is suppressed. Moreover, in the secondary battery in which an active material is not used in the negative electrode, in the case where an inorganic salt containing fluorine is used in the electrolyte solution, initial charge capacity is greater than that in the case where an inorganic salt containing fluorine is not used.

As described, with the use of an inorganic salt containing fluorine for the electrolyte solution, lithium in the form of dendrites (in the form of whiskers) can be prevented from being formed on a surface of the negative electrode in a secondary battery in which an active material is not used in the negative electrode, generation of lithium which does not contribute to a battery reaction can be suppressed, and discharge capacity is maintained, resulting in an increase in the discharge capacity. As described, in the secondary battery in which an active material layer is not provided in the negative electrode, a novel and significant effect can be obtained by the use of the inorganic salt containing fluorine in the electrolyte solution.

When the electrolyte solution contains fluorine, fluorine can be provided for lithium deposited on the surface of the current collector. An organic compound containing fluorine may be further added to the electrolyte solution as an additive, in which case formation of lithium in the form of dendrites (in the form of whiskers) can be prevented, generation of lithium which does not contribute to a battery reaction can be suppressed, and discharge capacity is maintained, resulting in an increase in the discharge capacity.

As the additive that is added to the electrolyte solution, ethylene carbonate containing fluorine, for example, fluoroethylene carbonate (4-Fluoro-1,3-dioxolane-2-one, FEC) can be given as one example. When such an additive is added to the electrolyte solution, it can be seen that cycle characteristics are improved in accordance with the additive amount. As described, in the secondary battery in which an active material layer is not provided in the negative electrode, when an organic compound containing fluorine is added to the electrolyte solution, a novel and significant effect can be obtained by the addition of the organic compound containing fluorine.

Although the case where carrier ions are lithium ions is described, carrier ions other than lithium ions can also be used. When alkali metal ions, alkaline-earth metal ions, beryllium ions, or magnesium ions are used as carrier ions other than lithium ions, an alkali metal (e.g., sodium or potassium), an alkaline-earth metal (e.g., calcium, strontium, or barium), beryllium, or magnesium may be used instead of lithium for the above lithium salts in the electrolyte.

The electrolyte solution used for the secondary battery preferably contains a small amount of dust particles and elements other than the constituent elements of the electrolyte solution (hereinafter, also simply referred to as impurities) so as to be highly purified. Specifically, the mass ratio of impurities to the electrolyte solution is less than or equal to 1%, preferably less than or equal to 0.1%, and more preferably less than or equal to 0.01%. An additive such as vinylene carbonate may be added to the electrolyte solution.

Next, the exterior body 106 is described. As the exterior body 106, for example, a film having a three-layer structure where a highly flexible metal thin film of aluminum, stainless steel, copper, nickel, or the like is provided over the inner surface formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of an electrolyte solution and a gas can be blocked and an insulating property and resistance to the electrolyte solution can be obtained. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inside in two, the sealing portion is formed in the place other than the fold, and a first region of the exterior body and a second region of the exterior body that overlaps with the first region are fusion-bonded. In a case where two exterior bodies are stacked, the sealing portion is formed along the entire circumference by heat fusion bonding or the like.

When a flexible material is selected from materials of the members described in this embodiment and used, a flexible lithium-ion secondary battery can be fabricated. Deformable devices are currently under active research and development. As secondary batteries for such devices, flexible secondary batteries are demanded.

Figure 7A:
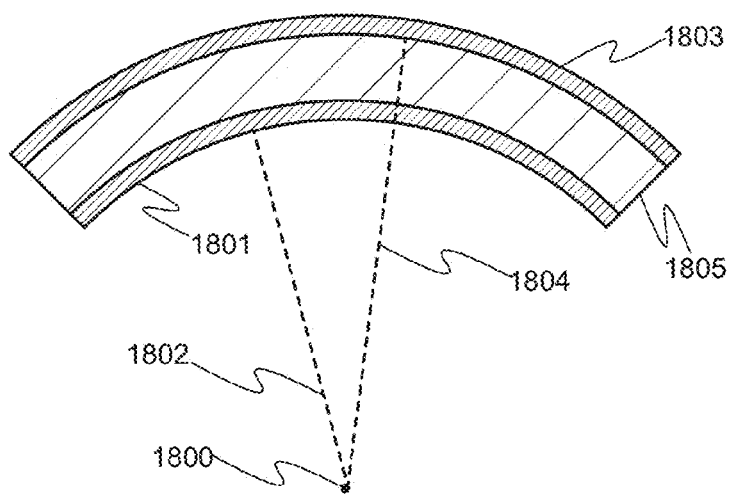
FIGS. 7A to 7D Diagrams illustrating the radius of curvature.
Figure 7B:
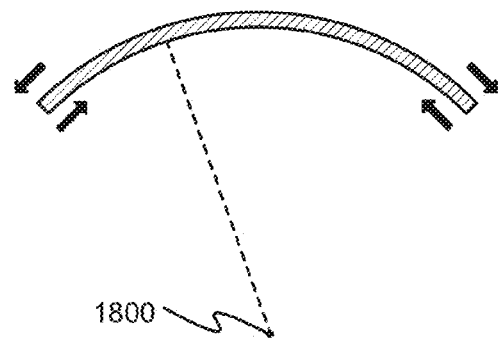

In the case of bending a secondary battery in which a component 1805 including electrodes and an electrolyte solution is sandwiched between two films as exterior bodies, a radius of curvature 1802 of a film 1801 close to a center of curvature 1800 of the secondary battery is smaller than a radius of curvature 1804 of a film 1803 far from the center of curvature 1800 (FIG. 7(A)). When the secondary battery is curved and has an arc-shaped cross section, compressive stress is applied to a surface of the film on the side closer to the center of curvature 1800 and tensile stress is applied to a surface of the film on the side farther from the center of curvature 1800 (FIG. 7(B)).

When the flexible lithium-ion secondary battery is changed in shape, strong stress is applied to the exterior bodies. However, even with the compressive stress and tensile stress due to the change in the shape of the secondary battery, the influence of a strain can be reduced by forming a pattern including projections or depressions on surfaces of the exterior bodies. For this reason, the secondary battery can change its shape in the range where the exterior body on the side closer to the center of curvature has a curvature radius of 30 mm, preferably 10 mm.

Figure 8A:
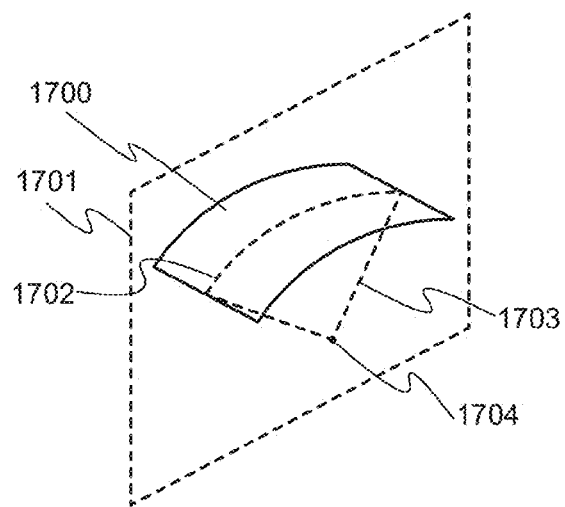
FIGS. 8A to 8C Diagrams illustrating the radius of curvature.
Figure 8B:
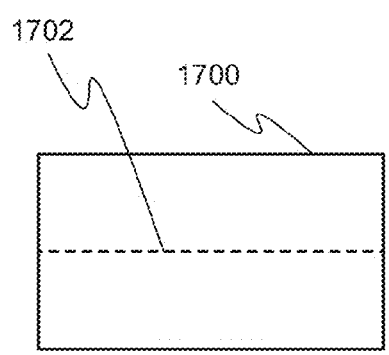
Figure 8C:
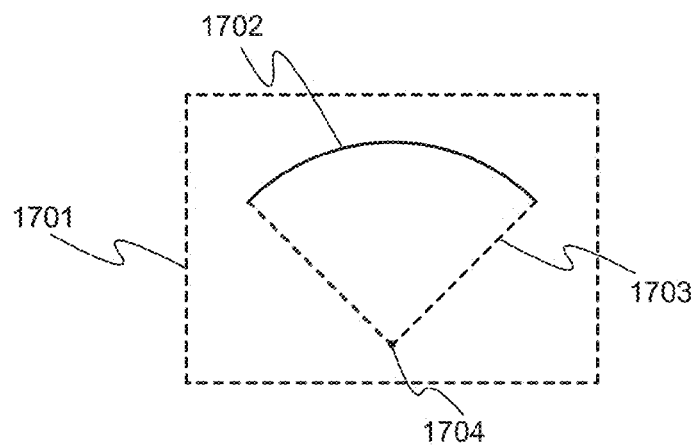

Description is given of the radius of curvature of a surface with reference to FIGS. 8A to 8C. In FIG. 8A, on a plane 1701 along which a curved surface 1700 is cut, part of a curve 1702, which is a form of the curved surface, is approximate to an arc of a circle, and the radius of the circle is referred to as a radius 1703 of curvature and the center of the circle is referred to as a center 1704 of curvature. FIG. 8B is a top view of the curved surface 1700. FIG. 8C is a cross-sectional view of the curved surface 1700 taken along the plane 1701. When a curved surface is cut along a plane, the radius of curvature of a curve, which is a form of the curved surface, depends on place along which the curved surface is cut. The radius of curvature of a curve which is a cross-sectional form of the curved surface is defined as the radius of curvature of a plane, on a plane along which the curved surface is cut such that the curve has the smallest radius of curvature.

Figure 7C:
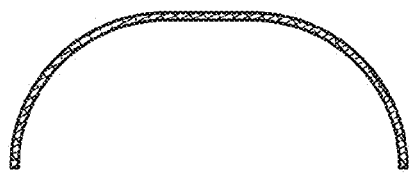
Figure 7D:

Note that the cross-sectional shape of the secondary battery is not limited to a simple arc shape, and the cross section can be partly arc-shaped; for example, a shape illustrated in FIG. 7C, a wavy shape (FIG. 7D), or an S shape can be used. When the curved surface of the secondary battery has a shape with a plurality of centers of curvature, the secondary battery can change its shape in the range where a curved surface with the smallest radius of curvature among radii of curvature with respect to the plurality of centers of curvature, which is a surface of one of the two external bodies on the side closed to the center of curvature, has a curvature radius of 30 mm, preferably 10 mm.

Note that although an example of use in a lithium-ion secondary battery is described in this embodiment, one embodiment of the present invention is not limited to this example. Application to a variety of secondary batteries such as a lead secondary storage battery, a lithium-ion polymer secondary battery, a nickel-hydrogen secondary battery, a nickel-cadmium secondary battery, a nickel-iron secondary battery, a nickel-zinc secondary battery, a silver oxide-zinc secondary battery, a solid-state battery, and an air battery is also possible. Application to a variety of power storage devices such as a primary battery, a capacitor, and a lithium-ion capacitor is also possible.

This embodiment can be implemented in appropriate combination with any of the other embodiments and example.

(Embodiment 2)

In this embodiment, examples of electronic devices each including the secondary battery illustrated in the above embodiment will be described with reference to FIGS. 9A to 9D.

As examples of electronic devices including secondary batteries, for example, digital cameras, digital video cameras, digital photo frames, mobile phones (also referred to as cellular phones or portable telephone devices), portable game consoles, portable information terminals, and audio reproducing devices are given. Specific examples of these electronic devices are illustrated in FIGS. 9A to 9D.

Figure 9A:
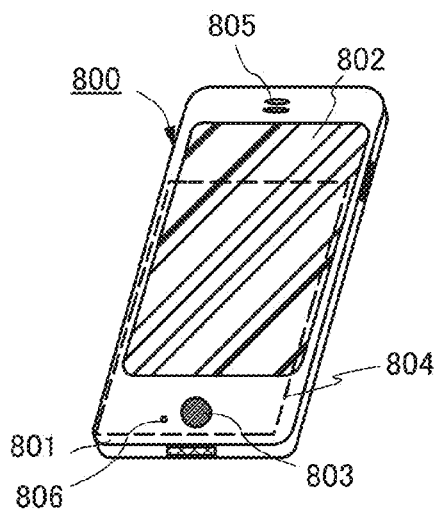
FIGS. 9A to 9D Diagrams illustrating electronic devices each including a secondary battery of one embodiment of the present invention.

FIG. 9A illustrates an example of a mobile phone. A mobile phone 800 is provided with, in addition to a display portion 802 incorporated in a housing 801, an operation button 803, a speaker 805, a microphone 806, and the like. Note that the use of a secondary battery 804 of one embodiment of the present invention in the mobile phone 800 results in weight reduction.

When the display portion 802 of the mobile phone 800 illustrated in FIG. 9A is touched with a finger or the like, data can be input. Users can make a call or text messaging by touching the display portion 802 with the finger or the like.

There are mainly three screen modes for the display portion 802. The first is a display mode mainly for displaying an image. The second is an input mode mainly for inputting data such as characters. The third is a display-and-input mode in which two modes of the display mode and the input mode are combined.

For example, in the case of making a call or composing an e-mail, a text input mode mainly for inputting text is selected for the display portion 802 so that text displayed on a screen can be inputted.

Furthermore, when a sensing device including a sensor such as a gyroscope and an acceleration sensor for detecting inclination is provided in the mobile phone 800, display on the screen of the display portion 802 can be automatically changed in direction by determining the orientation (vertical or horizontal) of the mobile phone 800.

The screen mode is switched by touching the display portion 802 or operating the operation button 803 of the housing 801. Alternatively, it may be switched depending on the kind of the image displayed on the display portion 802. For example, when a signal of an image displayed on the display portion is the one of moving image data, it is switched to the display mode. When the signal is the one of text data, it is switched to the input mode.

Moreover, in the input mode, if a signal detected by an optical sensor in the display portion 802 is detected and the input by touch on the display portion 802 is not performed for a certain period, the screen mode may be controlled so as to be changed from the input mode to the display mode.

The display portion 802 can function as an image sensor. For example, an image of a palm print, a fingerprint, or the like is taken with the display portion 802 touched with the palm or the finger, whereby personal authentication can be performed. Further, when a backlight or a sensing light source which emits near-infrared light is provided in the display portion, an image of a finger vein, a palm vein, or the like can be taken.

Figure 9B:
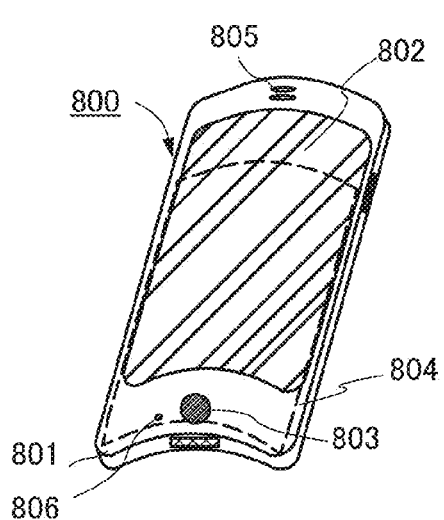
Figure 9C:
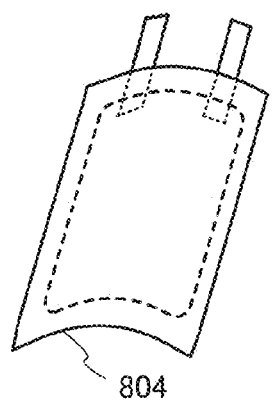

FIG. 9B illustrates the state where the mobile phone 800 is bent. When the whole mobile phone 800 is bent by the external force, the secondary battery 804 included therein is also bent. FIG. 9C illustrates the state of the bent secondary battery 804. The secondary battery 804 is a stacked-layer type secondary battery.

Figure 9D:
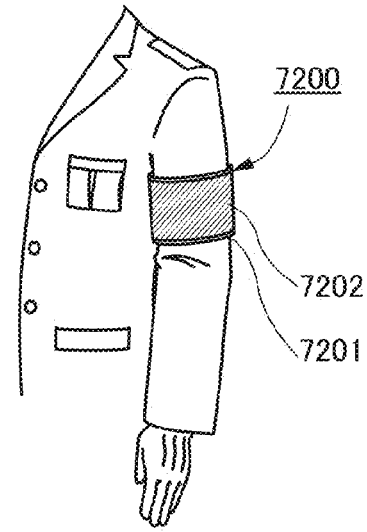

FIG. 9D illustrates an example of an armband display device. An armband display device 7200 includes a housing 7201 and a display portion 7202. Although not shown, a flexible secondary battery is included in the armband display device 7200. The flexible secondary battery changes in shape in accordance with change in the shape of the armband display device 7200.

Note that the structure and the like described in this embodiment can be used as appropriate in combination with any of the structures and the like in the other embodiments.

(Embodiment 3)

Figure 10A:
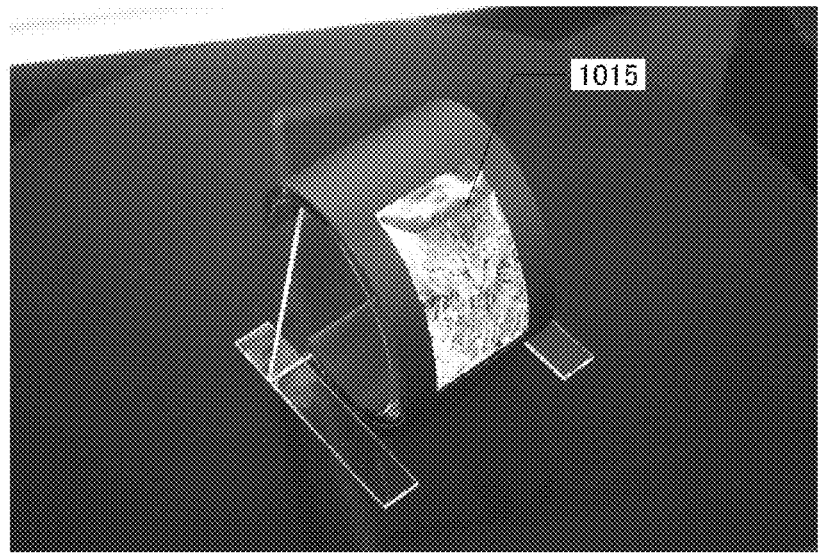
FIGS. 10A to 10C Diagrams illustrating an electronic device including a secondary battery of one embodiment of the present invention.
Figure 10B:
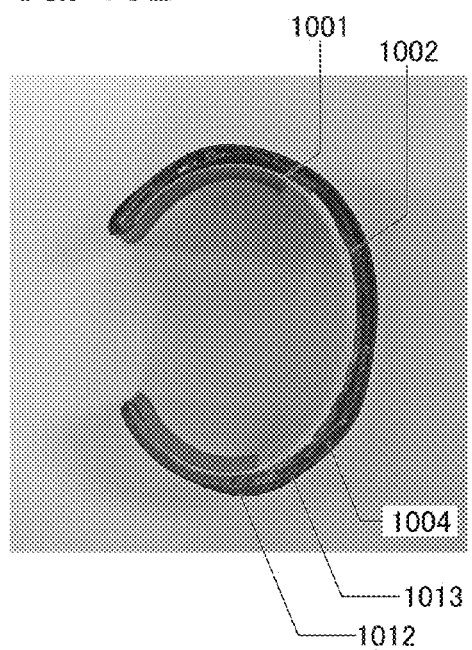
Figure 10C:
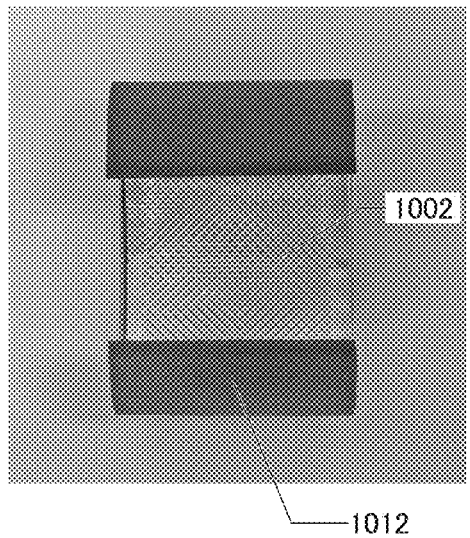
Figure 11:
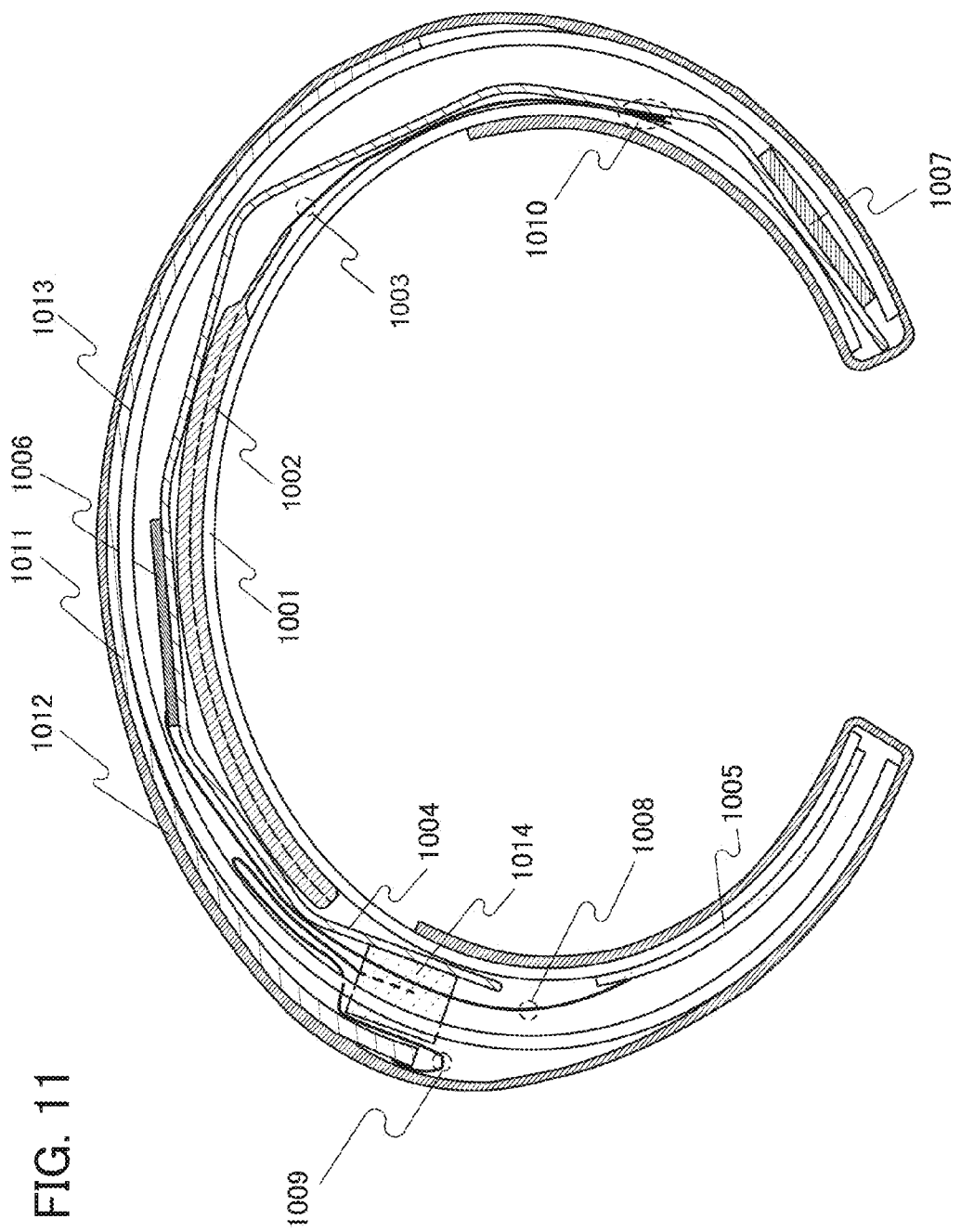
FIG. 11 A diagram of an electronic device which includes a secondary battery of one embodiment of the present invention and is observed from a side surface thereof.

In this embodiment, examples of electronic devices incorporating the lithium-ion secondary batteries described in Embodiment 1 will be described. FIG. 10A shows a photograph of the appearance of an electronic device incorporating the lithium-ion secondary battery obtained according to Embodiment 1. FIG. 10B shows a photograph of the electronic device taken from a side, and FIG. 10C shows a photograph of the electronic device taken from a back side. FIG. 11 is a schematic view of a structure when the electronic device is seen from the side.

The electronic device illustrated in FIGS. 10A to 10C and FIG. 11 is a display device that can be put on an arm and display an image or information. Since a flexible lithium-ion secondary battery is used, a shape that fits an arm can be achieved. The electronic device has a good design and thus can be used as an accessory.

The electronic device illustrated in FIGS. 10A to 10C and FIG. 11 includes a support structure body 1001, a secondary battery 1002, a control board 1004, a display module 1011, a protective member 1013, and a cover 1012. Specifically, the secondary battery 1002 is provided over the support structure body 1001, the control board 1004 is provided over the secondary battery 1002, the protective member 1013 is provided over the control board 1004, the display module 1011 and the cover 1012 are provided over the protective member 1013. In addition, the electronic appliance is provided with an antenna 1005 for wireless charging, and the wireless charging can be performed according to the Qi standard. The electronic device includes a communication device 1007 for wirelessly communicating data to be used to perform display with an external device.

In the secondary battery 1002 of one embodiment according to Embodiment 1, an exterior body is a thin film having flexibility and thus can be bonded to a support structure body 1001 with a curved surface and can change its shape along the curved surface of a region of the support structure body 1001 which has a large radius of curvature.

When a light-transmitting plastic substrate is used as the support structure body 1001 in the electronic device as illustrated in FIGS. 10B and 10C, the secondary battery 1002 can be visually recognized from the back surface side of the electronic device and a film surface that has been embossed can be observed.

The support structure body 1001 is flexible. Thus, the support structure body 1001 can be easily bent. Note that a material other than plastic can be used for the support structure body 1001. The support structure body 1001 is in the form of a bracelet obtained by curving a band-like structure body. In addition, the support structure body 1001 is at least partly flexible, and it can be worn on a wrist while the support structure body 1001 is changed in shape.

The protective member 1013 protects a component inside the electronic device, in particular, the control board 1004 from a sudden shock. It can change its shape as a part of the electronic device and thus can be made of a material similar to that of the support structure body 1001. Note that the protective member 1013 may be made of a material different from that of the support structure body 1001.

The cover 1012 is a light-blocking film having one surface coated with an adhesive and covers the whole of the electronic device to bring components together and has an opening in the display portion 1015. The cover 1012 can conceal the internal structure owing to its light-blocking property, improving the design of the electronic device. Note that the electronic device may be intentionally formed so that its internal structure can be seen externally. In the case of employing the design, the cover 1012 does not have to have a light-blocking property. Also in the case where the protective member 1013 has a light-blocking property, the cover 1012 does not have to have a light-blocking property.

The control board 1004 has slits to bend it, and is provided with a communication device 1007 conforming to Bluetooth (registered trademark, the same as IEEE802.15.1) standards, a microcomputer, a storage device, an FPGA, a DA converter, a charge control IC, a level shifter, and the like. In addition, the control board 1004 is connected to a display module 1011 including a display portion 1015 through an input/output connector 1014. In addition, the control board 1004 is connected to the antenna 1005 through a wiring 1008 and connected to the secondary battery 1002 through a wiring 1003 and a connection portion 1010. A power supply control circuit 1006 controls charge and discharge of the secondary battery 1002.

The display module 1011 refers to a display panel provided with at least an FPC 1009. The electronic appliance in FIG. 11 includes the display portion 1015, the FPC 1009, and a driver circuit and preferably further includes a converter for power feeding from the secondary battery 1002.

In the display module 1011, the display portion 1015 is flexible and a display element is provided over a soft and flexible film. The secondary battery 1002 and the display portion are preferably disposed so as to partly overlap with each other. When the secondary battery 1002 and the display portion are disposed so as to partly or entirely overlap with each other, the electrical path, i.e., the length of a wiring, from the secondary battery 1002 to the display portion 1015 can be shortened, whereby power consumption can be reduced. In addition, providing the display module between the protective member 1013 and the cover 1011 enables protection of the display module 1011 from unexpected deformation such as wrinkles or a twist, increasing the lifetime of the electronic device as a product.

Examples of methods for fabricating the display element over the flexible film include a method in which the display element is directly formed over the flexible film, a method in which a layer including the display element is formed over a rigid substrate such as a glass substrate, the substrate is removed by etching, polishing, or the like, and then the layer including the display element and the flexible film are attached to each other, a method in which a separation layer is provided over a rigid substrate such as a glass substrate, a layer including the display element is formed thereover, the rigid substrate and the layer including the display element are separated from each other using the separation layer, and then the layer including the display element and the flexible film are attached to each other, and the like.

In addition, the display portion 1015 may be provided with a touch panel so that input of data to the electronic device and operation can be performed therewith.

Note that the structure and the like described in this embodiment can be used as appropriate in combination with any of the structures and the like in the other embodiments.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part thereof) illustrated in one embodiment with another part of the diagram, a different diagram (or may be part thereof) illustrated in the embodiment, and/or a diagram (or may be part thereof) illustrated in one or a plurality of different embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed and part of the range is removed, whereby one embodiment of the invention can be constituted excluding part of the range can be constructed. In this manner, it is possible to specify the technical scope of one embodiment of the present invention so that a conventional technology is excluded, for example.

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

EXAMPLE 1

In this example, as for a lithium-ion secondary battery in which an active material is not used in a negative electrode, which is an embodiment of the present invention, lithium that is deposited on a surface of a negative electrode current collector at the time of charging is observed by SEM and the results are described.

[Fabrication of Positive Electrode and Negative Electrode]

First, a negative electrode is described. For the negative electrode, a rolled copper foil current collector (18 μm) was used.

Note that in the secondary battery of to one embodiment of the present invention, an active material layer is not formed over a current collector. Thus, apparatuses required for the steps of providing the active material over a negative electrode current collector, that is, apparatuses such as a mixer for forming slurry, a coater for coating slurry, and a dryer for drying the slurry are not necessary. Thus, time required for each step in the case where such an apparatus was used was able to be saved. Furthermore, costs for members such as an active material, a conductive additive, and a binder were not required. Moreover, it was not necessary to consider the yield of the steps of providing the active material on the negative electrode current collector and thus the yield of the overall fabrication process of the secondary battery was able to be increased.

Next, fabrication steps of a positive electrode is described. As the positive electrode, slurry for the positive electrode was formed using $LiFePO_4$ as an active material, graphene oxide (GO) as a conductive additive, and PVDF as a binder at a compounding ratio of $LiFePO_4$:GO:PVDF=94.4:0.6:5 (weight %), and N-methyl-2-pyrrolidone (NMP) as a solvent.

Then, after the formed slurry was applied to an aluminum current collector (20 μm) subjected to undercoating in advance, drying was performed. As the application conditions, a continuous coating device was used, a coating method was slot die, a supplying system was a metering pump, and a coating speed was 1.0 m/min. Drying was performed until NMP was completely vaporized under an atmospheric pressure at 80° C. After that chemical reduction of graphene oxide was performed.

As the conditions of the chemical reduction, graphene oxide was reduced by reaction in a solvent containing a reducing agent. The reduction treatment was performed at 60° C. for 4.5 hours. Ascorbic acid was used as the reducer. Ethanol was used as the solvent, and the concentration of the reducer was 13.5 g/L. After that, cleaning with ethanol was performed, and drying was performed at 70° C. for 10 hours. The drying was performed in a vacuum atmosphere.

Subsequently, a positive electrode active material layer was formed by a roll press method so as to be consolidated.

[Fabrication of Secondary Batteries]

Next, using the formed positive electrode and negative electrode, secondary batteries were fabricated. The characteristics were measured with the use of CR2032 coin-type secondary batteries (a diameter of 20 mm and a height of 3.2 mm). For a separator, a stack of 25-μm-thick polypropylene on the positive electrode side and cellulose fiber on the negative electrode side was used. The positive electrode and the negative electrode each with an area of 1.13 $cm^2$ were used. A positive electrode can and a negative electrode were formed of stainless steel (SUS).

As electrolyte solutions, three kinds of solutions of Electrolyte solution A, Electrolyte solution B, and Comparative electrolyte solution A were fabricated. Note that as a solvent of each of the electrolyte solutions, a mixed solvent in which EC (ethylene carbonate) and DEC (diethyl carbonate) were mixed at a volume ratio of 1:1 was used. Electrolyte solution A was fabricated by dissolving lithium hexafluorophosphate ($LiPF_6$) in the mixed solvent at approximately 1 mol/L. Secondary battery A was fabricated using Electrolyte solution A. Furthermore, Electrolyte solution B was fabricated by dissolving lithium tetrafluoroborate ($LiBF_4$) in the mixed solvent at approximately 1 mol/L. Secondary battery B was fabricated using Electrolyte solution B.

Furthermore, Comparative electrolyte solution A was fabricated by dissolving lithium perchlorate ($LiClO_4$) in the mixed solvent at approximately 1 mol/L. Comparative secondary battery A was fabricated using Comparative electrolyte solution A.

Next, each of the fabricated three kinds of thin film secondary batteries was charged and discharged. The charging and discharging were performed at a constant current of 1.7 mA. The upper limit voltage and the lower limit voltage of the charging and discharging were 4 V and 2 V, respectively. In addition, the charging and discharging were performed under a temperature condition of 25° C.

[SEM Observation]

Figure 12A:
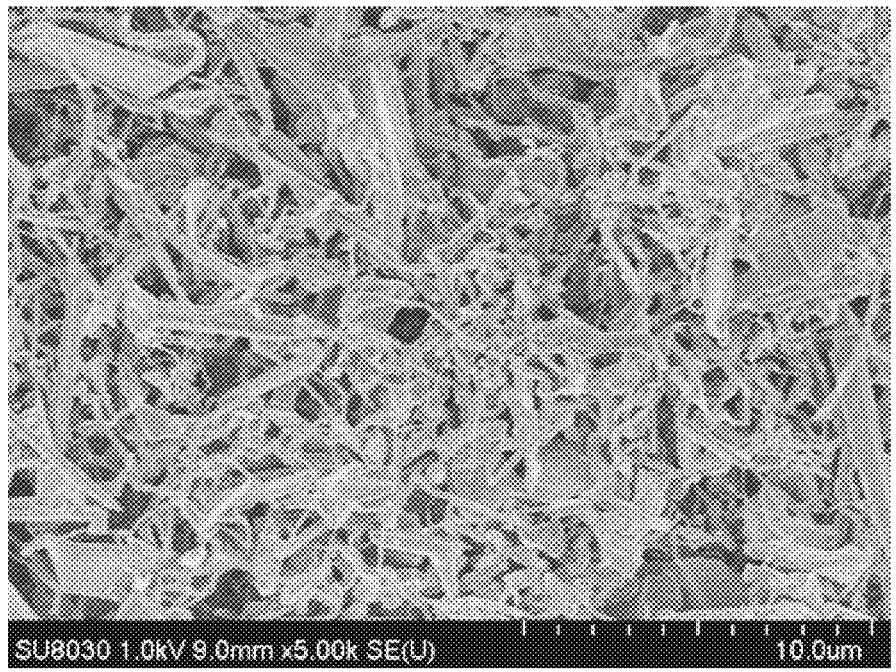
FIGS. 12A and 12B Images of surfaces of negative electrodes of secondary batteries observed by SEM.

In the initial charging, battery operation was stopped when the voltage reached to 4 V that was an upper limit voltage. Each battery was disassembled and the negative electrode with lithium deposited was taken out and cleaned. As a cleaning solution, dimethyl carbonate was used. The surface of this negative electrode was observed by scanning electron microscope (SEM: Scanning Electron Microscope). The results of the SEM observation are shown in FIGS. 3A and 3B and FIG. 12A.

Figure 3A:
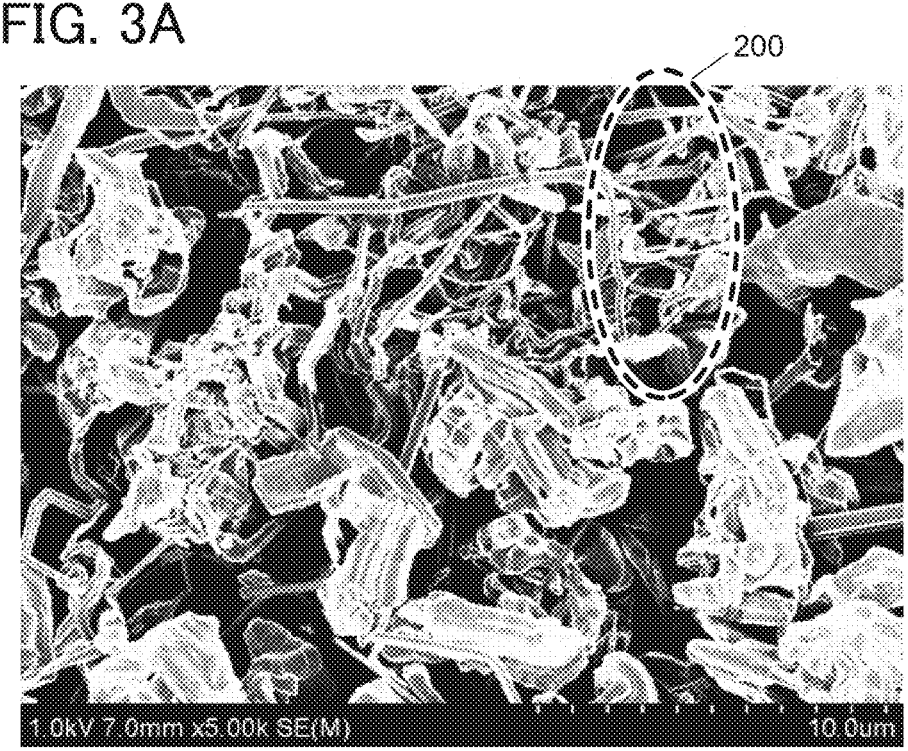
FIGS. 3A and 3B Images of surfaces of negative electrodes of secondary batteries observed by SEM.
Figure 3B:
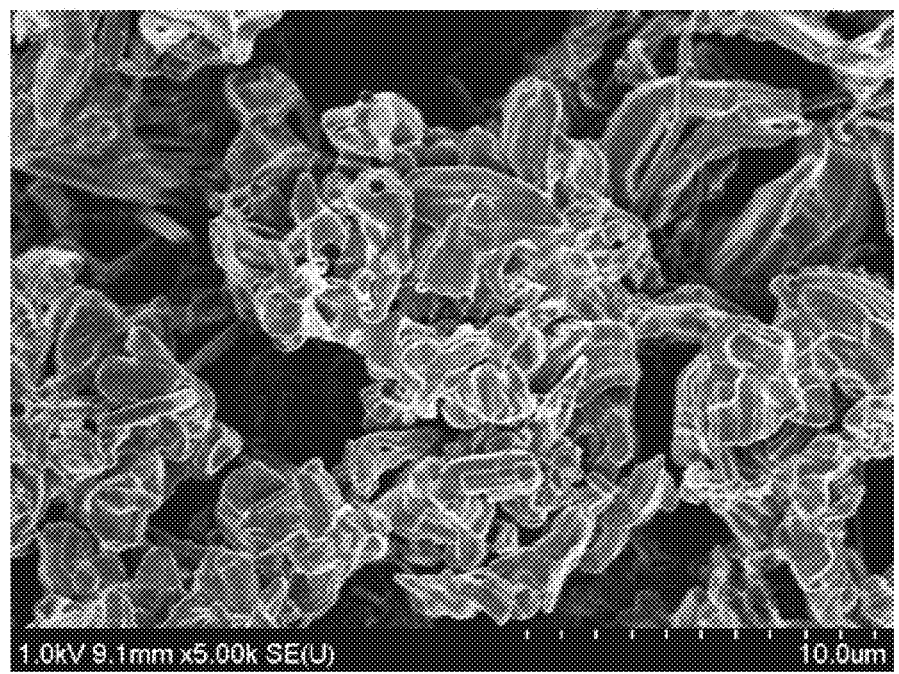

FIG. 3A is a SEM observation image of the negative electrode taken from the secondary battery (Secondary battery A) including lithium hexafluorophosphate ($LiPF_6$) as a salt in the electrolyte solution. FIG. 3B is a SEM image of the negative electrode taken from the secondary battery (Secondary battery B) including lithium tetrafluoroborate ($LiBF_4$) as a salt in the electrolyte solution. FIG. 12A is a SEM image of the negative electrode taken from the secondary battery (Comparative secondary battery A) including lithium perchlorate ($LiClO_4$) as a salt in the electrolyte solution.

As shown in FIG. 3A, many lithium whiskers were observed on the current collector taken from Secondary battery A. Meanwhile, as shown in FIG. 3B, it was confirmed that the number of lithium dendrites (whiskers) on the current collector taken from Secondary battery B was smaller than that on the current collector taken from Secondary battery A. Furthermore, as shown in FIG. 12A, the largest number of lithium dendrites (whiskers) were observed from lithium deposited on the current collector taken from Comparative secondary battery A. From the results of observation by SEM, it was confirmed that generation of lithium dendrites (whiskers) 200 was able to be suppressed in the negative electrode of the secondary battery in which an inorganic salt containing fluorine was used in the electrolyte solution.

The relation between the electrolyte solution and the deposition of lithium dendrites (whiskers) is described later.

EXAMPLE 2

In this example, as for a lithium-ion secondary battery in which an active material is not used in a negative electrode, which is an embodiment of the present invention, lithium that is deposited on a surface of a negative electrode current collector at the time of charging is observed by XPS and the result is described.

Secondary batteries fabricated in this example are described. Because the fabrication conditions of the positive electrode and the negative electrode are the same as the fabrication conditions of the positive electrode and the negative electrode described in Example 1, the description is omitted. The fabrication conditions of the secondary batteries other than the fabrication conditions of the electrolyte solutions are also the same as the fabrication conditions described in Example 1; thus, the description is omitted except for a part.

[Fabrication of Secondary Batteries]

Electrolyte solutions used for the secondary batteries fabricated in this example are described. As the electrolyte solutions, two kinds of Electrolyte solution C and Electrolyte solution D were used. Electrolyte solution C was formed in such a manner that a mixed solvent of EC and DEC mixed at a volume ratio of 3:7 was used as a solvent, and lithium hexafluorophosphate (LiPF$_6$) was dissolved in the mixed solvent at a concentration of 1 mol/L. Secondary battery C was formed using Electrolyte solution C. Furthermore, Electrolyte solution D was formed in such a manner that a mixed solvent of EC and DEC mixed at a volume ratio of 1:1 was used as a solvent, and lithium tetrafluoroborate (LiBF$_4$) was dissolved in the mixed solvent at a concentration of 1 mol/L. Secondary battery D was formed using Electrolyte solution D.

Next, each of the fabricated two kinds of thin film secondary batteries was charged and discharged. The charging and discharging were performed at a constant current of 1.7 mA. The upper limit voltage and the lower limit voltage of the charging and discharging were 4 V and 2 V, respectively. In addition, the charging and discharging were performed under a temperature condition of 25° C.

[XPS Analysis]

In the initial charging, battery operation was stopped when the voltage reached to 4 V that was an upper limit voltage. Each battery was disassembled and the negative electrode with lithium deposited was taken out and cleaned. As a cleaning solution, dimethyl carbonate was used. The surface of this negative electrode was observed by X-ray photoelectron spectroscopy measurement (XPS). The results are shown in FIG. 2.

Figure 2:
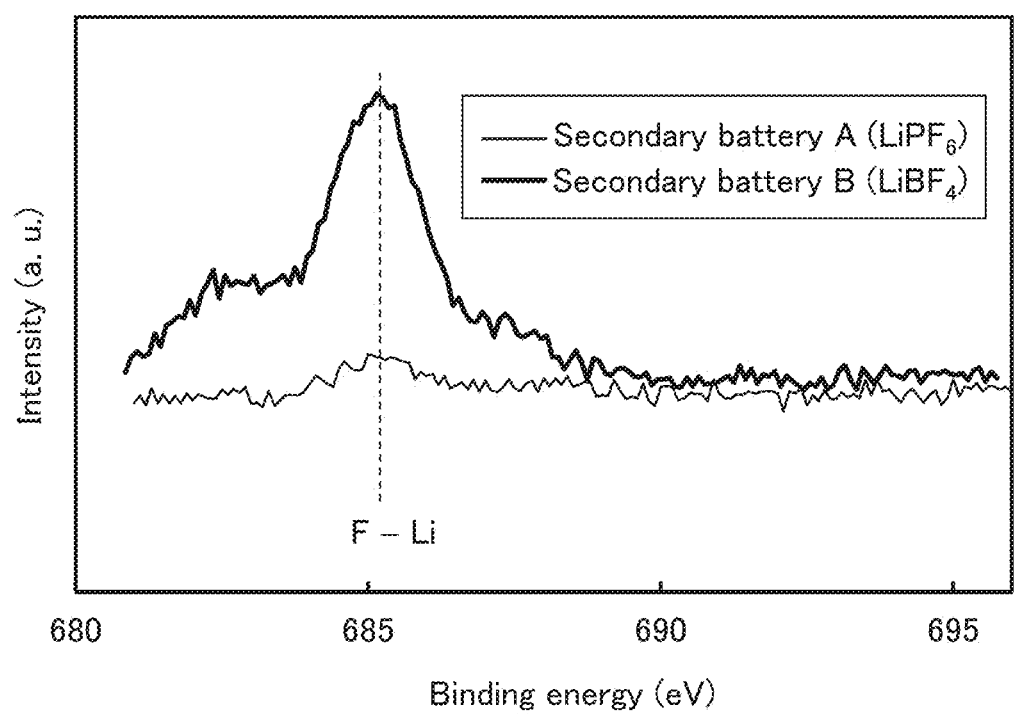
FIG. 2 A graph illustrating the results of XPS analyses of surfaces of negative electrodes of secondary batteries of one embodiment of the present invention.

FIG. 2 shows XPS spectra in a region where peaks derived from lithium fluoride appear. A peak derived from lithium fluoride was clearly observed from the surface of the negative electrode taken from Secondary battery D. Furthermore, though it is comparatively small, a peak derived from lithium fluoride was observed also from the surface of the negative electrode taken from Secondary battery C. From the analysis, it was demonstrated that lithium fluoride was contained in the surface of lithium deposited on the surface of the negative electrode in both batteries. Moreover, it was found that the amount is larger in the negative electrode of Secondary battery D using lithium tetrafluoroborate (LiBF$_4$) than in the negative electrode of Secondary battery C using lithium hexafluorophosphate (LiPF$_6$).

The relation between the electrolyte solution and lithium fluoride deposited on the surface of the negative electrode is described later.

EXAMPLE 3

In this example, charge and discharge characteristics of the lithium-ion secondary battery in which an active material is not used in a negative electrode, which is one embodiment of the present invention, is described.

Secondary batteries fabricated in this example are described. Because the condition of the negative electrode is the same as that described in Embodiment 1, description is omitted. The fabrication conditions of the secondary batteries other than the fabrication conditions of the electrolyte solutions are also the same as the fabrication conditions described in Example 1; thus, the description is omitted except for a part.

[Fabrication of Positive Electrode]

First, slurry for a positive electrode was formed by combining LiFePO$_4$, Acetylene black, (hereinafter referred to as AB), and PVDF at a ratio of LiFePO$_4$:AB:PVDF=90:5:5 (weight %), and using NMP as a solvent.

Then, after the formed slurry was applied to an aluminum current collector (20 μm) subjected to undercoating in advance, drying was performed. Drying was performed until NMP was completely vaporized under an atmospheric pressure at 80° C. Subsequently, the positive electrode active material layer was pressed by a roll press method so as to be consolidated.

Next, capacity values used for calculation of the positive electrode is described. In calculating the capacity of the positive electrode, 170 mAh/g was used as the capacity of LiFePO$_4$.

[Fabrication of Secondary Batteries]

The electrolyte solutions used for the secondary batteries fabricated in this example are described. As the electrolyte solutions, two kinds of solutions of Electrolyte solution E and Electrolyte solution F were used. Electrolyte solution E was formed in such a manner that a mixed solvent of EC and DEC mixed at a volume ratio of 1:1 was used as a solvent, and lithium hexafluorophosphate (LiPF$_6$) was dissolved in the mixed solvent at a concentration of 1 mol/L. Secondary battery E was formed using Electrolyte solution E. Electrolyte solution F was formed in such a manner that a mixed solvent of EC and DEC mixed at a volume ratio of 1:1 was used as a solvent, and lithium tetrafluoroborate (LiBF$_4$) was dissolved in the mixed solvent at a concentration of 1 mol/L. Secondary battery F was formed using Electrolyte solution F.

[Charge and Discharge Characteristics]

Figure 4:
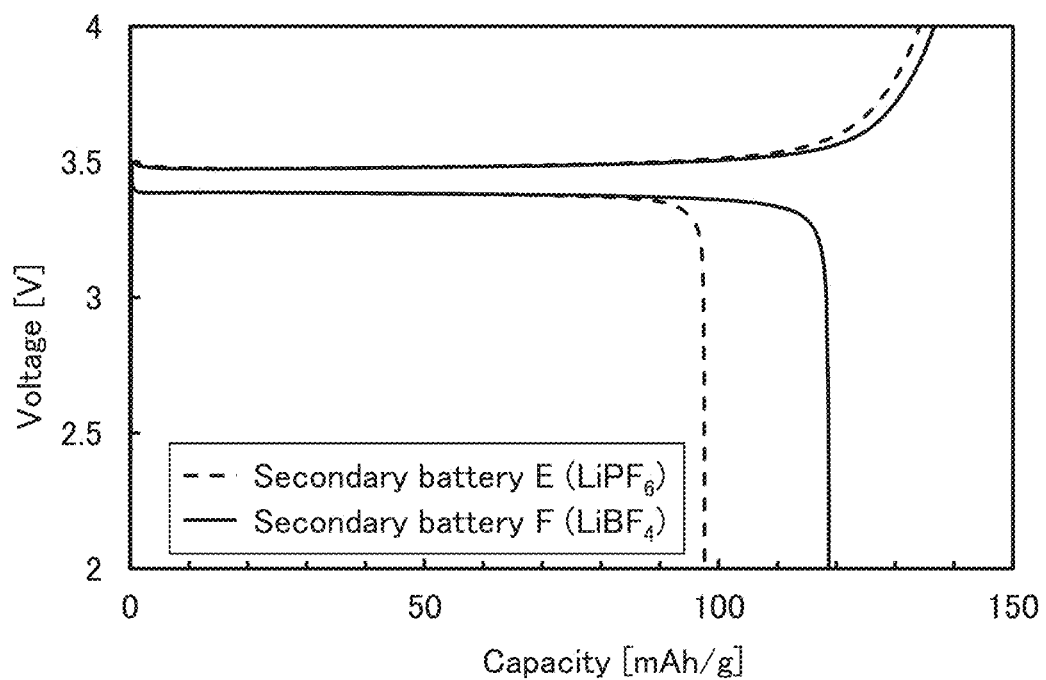
FIG. 4 A graph showing charge and discharge curves of secondary batteries of one embodiment of the present invention.

Next, the fabricated secondary batteries were charged and discharged. The charging and discharging were performed at a constant current of 1.7 mA. The upper limit voltage and the lower limit voltage of the charging and discharging were 4 V and 2 V, respectively. In addition, the charging and discharging were performed repeatedly under a temperature condition of 25° C. FIG. 4 shows the obtained initial charge and discharge characteristics.

As shown in FIG. 4, it was confirmed that the initial discharge capacity of Secondary battery F in which lithium tetrafluoroborate ($LiBF_4$) was used for the electrolyte solution was higher than that of Secondary battery E in which lithium hexafluorophosphate ($LiPF_6$) was used for the electrolyte solution.

In a lithium-ion secondary battery in which an active material is used in a negative electrode, lithium tetrafluoroborate ($LiBF_4$) lacks the chemical stability and is dissociated more easily when compared with lithium hexafluorophosphate ($LiPF_6$) and thus the discharge capacity when lithium tetrafluoroborate is used in the electrolyte solution is relatively low. However, the results in FIG. 4 was opposite to this, and shows that the discharge capacity of Secondary battery F in which lithium tetrafluoroborate ($LiBF_4$) was used for the electrolyte solution was comparatively higher than that of Secondary battery E in which lithium hexafluorophosphate ($LiPF_6$) was used for the electrolyte solution.

The results described in Embodiments 1 to 3 are summarized. That is, when lithium tetrafluoroborate ($LiBF_4$) in an electrolyte solution is partly dissociated, fluorine is provided for lithium deposited on a surface of a negative electrode current collector, whereby lithium fluoride is formed. The lithium fluoride formed on the surface of the negative electrode suppresses formation of lithium dendrites (whiskers) at the time of charging of the secondary battery. As a result, lithium that does not contribute to a battery reaction, which is caused by elution of roots of whiskers or the like at the time of discharging, can be prevented, and discharge capacity can be maintained without being lost; thus, discharge capacity is larger than that in which lithium hexafluorophosphate ($LiPF_6$) is used.

However, also in the secondary battery in which lithium hexafluorophosphate ($LiPF_6$) was used, formation of lithium fluoride on the surface can be observed from the results of XPS; therefore, an effect caused by the formation of lithium fluoride can be confirmed though it is relatively small.

As described above, with the use of an inorganic salt containing fluorine in the electrolyte solution, formation of lithium dendrites (whiskers) can be prevented, generation of lithium that does not contribute to a battery reaction is suppressed, and discharge capacity is maintained; as a result, discharge capacity of the secondary battery can be increased.

EXAMPLE 4

In this example, a lithium-ion secondary battery in which an active material is not used in a negative electrode and ethylene carbonate containing fluorine is added as an additive to an electrolyte solution, which is one embodiment of the present invention, is described.

Secondary batteries fabricated in this example are described. Because the condition of the negative electrode is the same as that described in Embodiment 1, description is omitted. Because the condition of the positive electrode is the same as that described in Embodiment 3, description is omitted. The fabrication conditions of the secondary batteries other than the fabrication conditions of the electrolyte solutions are also the same as the fabrication conditions described in Example 1; thus, the description is omitted except for a part.

[Fabrication of Secondary Batteries]

Electrolyte solution G used in the secondary batteries fabricated in this example is described. First, PC (propylene carbonate) was used as a solvent, and lithium tetrafluoroborate ($LiBF_4$) was dissolved in the solvent at a concentration of 1 mol/L. FEC (fluoroethylene carbonate) was added to the fabricated solution as an additive under four conditions, whereby Electrolyte solutions G-1 to G-4 were fabricated.

That is, Electrolyte solution G-2 was formed by adding and mixing FEC at 2 wt % to the weight of solution. Electrolyte solution G-3 was formed by adding and mixing FEC at 20 wt % to the weight of solution. Electrolyte solution G-4 was fabricated by adding and mixing FEC at 50 wt % to the weight of solution. Electrolyte solution G-1 is a solution to which FEC is not added.

Using Electrolyte solution G-1 to Electrolyte solution G-4, Secondary battery G-1 to Secondary battery G-4 were fabricated.

[Charge and Discharge Characteristics]

Figure 5:
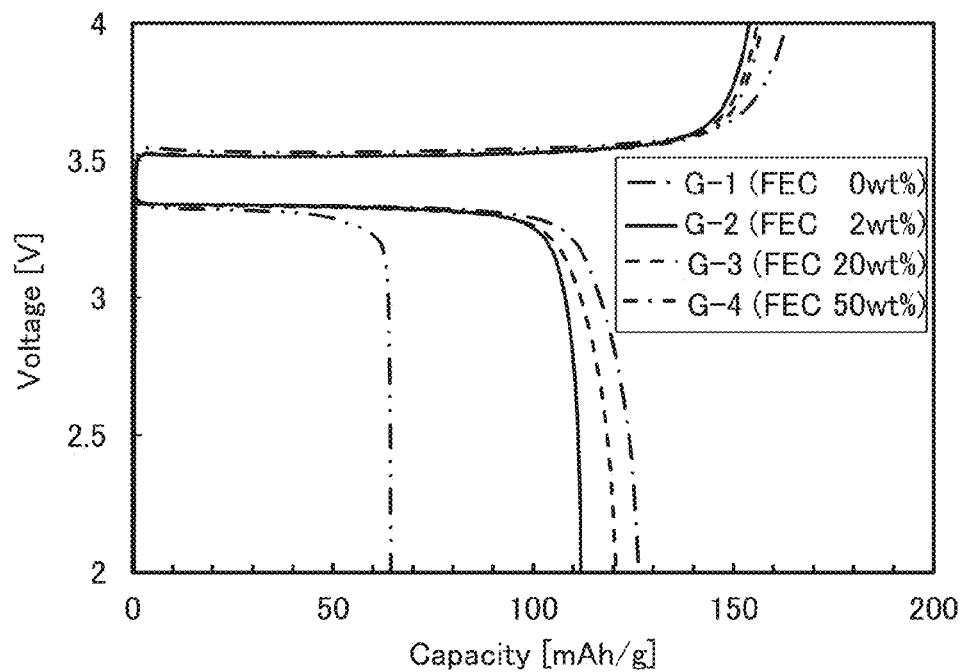
FIG. 5 A graph showing charge and discharge curves of secondary batteries of one embodiment of the present invention.
Figure 6:
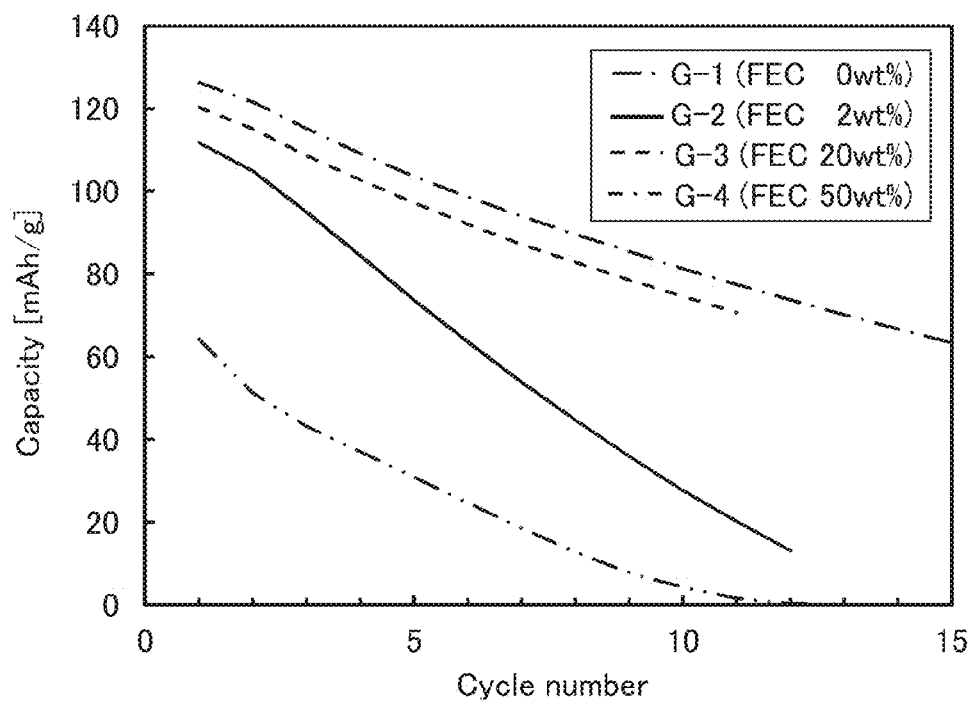
FIG. 6 A graph showing cycle characteristics of secondary batteries of one embodiment of the present invention.

Next, the fabricated secondary batteries were charged and discharged. The charging and discharging were performed at a constant current of 1.7 mA. The upper limit voltage and the lower limit voltage of the charging and discharging were 4 V and 2 V, respectively. In addition, the charging and discharging were repeatedly performed under a temperature condition of 25° C. FIG. 5 shows the initial charge and discharge characteristics. FIG. 6 shows cycle characteristics.

As shown in FIG. 5, by addition of FEC to the electrolyte solutions of the secondary batteries, discharge capacities are drastically improved. The effect of addition of FEC appears when the additive amount is 2 wt %. The effect is further remarkable when the additive amount is 20 wt %. Though the effect tends to be saturated when the additive amount is 50 wt %, it is confirmed that the discharge capacities are improved as the additive amount of FEC is increased.

This is because of the following reasons. Fluorine is supplied from FEC to lithium deposited by charging on the surface of the negative electrode current collector, lithium fluoride is formed on the surface the deposited lithium, and thus deposition of lithium dendrites (whiskers) is suppressed when lithium is deposited by further charging. The amount of lithium that is to be lost as lithium that does not contribute to a battery reaction is reduced, thereby suppressing a decrease in the amount of discharge capacity.

From the cycle characteristics in FIG. 6, the state where the cycle characteristics are improved in accordance with the additive amount of FEC is confirmed. The amount of lithium that is to be lost as lithium that does not contribute to a battery reaction is reduced by addition of FEC and the discharge capacity is maintained.

[Observation by SEM]

Figure 12B:
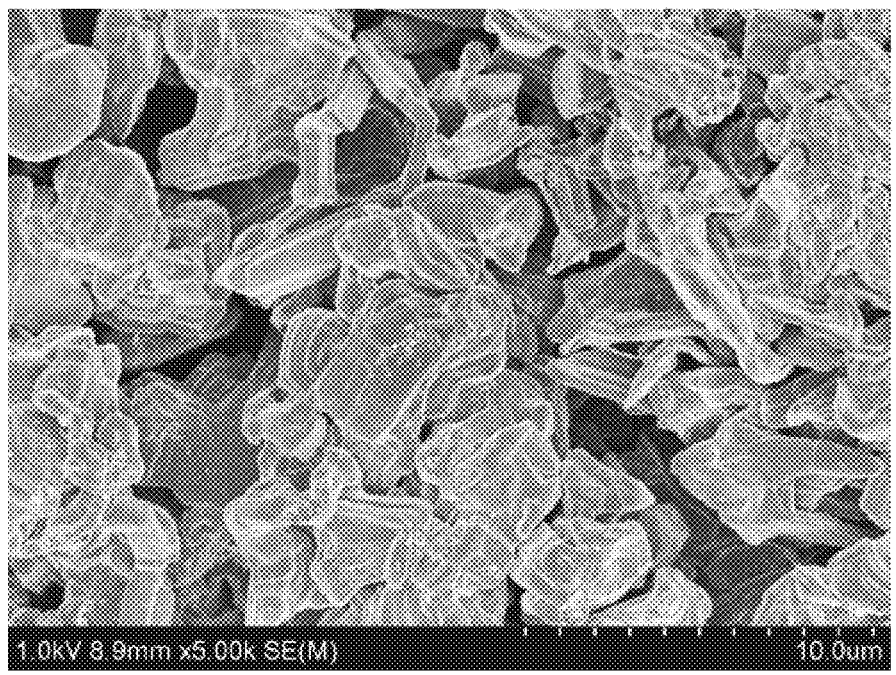

A secondary battery was fabricated in the same condition as Secondary battery G-3. In the initial charging, battery operation was stopped when the voltage reached to 4 V that was an upper limit voltage. The battery was disassembled and the negative electrode with lithium deposited was taken out and cleaned. As a cleaning solution, dimethyl carbonate was used. The surface of this negative electrode was observed by scanning electron microscope (SEM: Scanning Electron Microscope). The result of the SEM observation is shown in FIG. 12B. In FIG. 12B, on a current collector taken from Secondary battery G-3, deposition of lithium dendrites (whiskers) was not confirmed. Not only from lithium tetrafluoroborate ($LiBF_4$) in the electrolyte solution but also from FEC, fluorine is supplied to lithium on the surface of the negative electrode, so that lithium fluoride is formed, whereby formation of lithium dendrites (whiskers) is suppressed.

The above examples show that because supply of fluorine from the electrolyte solution to the surface of the negative electrode can suppress deposition of lithium dendrites (whiskers) on the surface of the negative electrode at the time of charging, the lithium-ion secondary battery can be fabricated without a negative electrode active material. Fluorine may be contained in a salt in the electrolyte solution; alternatively it may be contained as an additive of the electrolyte solution.

REFERENCE NUMERALS 101 positive electrode
101a positive electrode current collector
101b positive electrode active material layer
102 negative electrode current collector
104 separator
105 electrolyte solution
106 exterior body
108 spacer
110 lithium-ion secondary battery
115 lead electrode
116 sealing portion
200 dendrite (whisker)
800 mobile phone
801 housing
802 display portion
803 operation button
804 secondary battery
805 speaker
806 microphone
1001 support structure body
1002 secondary battery
1003 wiring
1004 control board
1005 antenna
1006 power supply control circuit
1007 communication device
1008 wiring
1009 FPC
1010 connection portion
1011 display module
1012 cover
1013 protective member
1014 input/output connector
1015 display portion
1700 curved surface
1701 plane
1702 curve in a form of a curved surface
1703 radius of curvature
1704 center of curvature
1800 center of curvature
1801 film
1802 radius of curvature
1803 film
1804 radius of curvature
1805 electrode, electrolyte solution, and the like
7100 portable display device
7101 housing
7102 display portion
7103 operation button
7104 secondary battery
7200 armband display device
7201 housing
7202 display portion

The invention claimed is:

1. A secondary battery comprising:
a positive electrode;
a negative electrode comprising a negative electrode current collector;
a separator between the positive electrode and the negative electrode; and
a spacer between the separator and the negative electrode,
wherein the negative electrode does not contain an active material layer,
wherein the spacer has a spherical shape,
wherein a material of the spacer is a polymer, and
wherein the spacer is in direct contact with the negative electrode current collector.

2. The secondary battery according to claim 1, further comprising an electrolyte solution comprising fluorine.

3. The secondary battery according to claim 2, wherein the negative electrode current collector is in direct contact with the electrolyte solution.

4. The secondary battery according to claim 1, wherein the negative electrode current collector is capable of making a deposit on a surface in charging.

5. The secondary battery according to claim 1, wherein the negative electrode current collector is capable of making a deposit comprising lithium fluoride on a surface in charging.

6. The secondary battery according to claim 2,
wherein the electrolyte solution comprises an organic compound comprising fluorine or an inorganic salt comprising fluorine, and
wherein a weight ratio of the organic compound or the inorganic salt to the electrolyte solution is 2 wt % or more.

7. The secondary battery according to claim 6, wherein the organic compound is fluoroethylene carbonate.

8. The secondary battery according to claim 6, wherein the inorganic salt is lithium tetrafluoroborate or lithium hexafluorophosphate.

9. A secondary battery comprising:
a positive electrode;
a negative electrode comprising a negative electrode current collector;
a separator between the positive electrode and the negative electrode; and
a spacer between the separator and the negative electrode,
wherein the negative electrode does not contain an active material layer,
wherein the spacer has a spherical shape,
wherein a material of the spacer is a polymer,
wherein the negative electrode current collector is in direct contact with the spacer, and
wherein each of the positive electrode, the negative electrode, the separator and the spacer has flexibility.

10. The secondary battery according to claim 9, further comprising an electrolyte solution comprising fluorine.

11. The secondary battery according to claim 10, wherein the negative electrode current collector is in direct contact with the electrolyte solution.

12. The secondary battery according to claim 10,
wherein the electrolyte solution comprises an organic compound comprising fluorine or an inorganic salt comprising fluorine, and
wherein a weight ratio of the organic compound or the inorganic salt to the electrolyte solution is 2 wt % or more.

13. The secondary battery according to claim 12, wherein the organic compound is fluoroethylene carbonate.

14. The secondary battery according to claim 12, wherein the inorganic salt is lithium tetrafluoroborate or lithium hexafluorophosphate.

\* \* \* \* \*